United States Patent
Yoneoka

(10) Patent No.: US 10,171,809 B2
(45) Date of Patent: Jan. 1, 2019

(54) VIDEO ENCODING APPARATUS AND VIDEO ENCODING METHOD

(71) Applicant: FUJITSU LIMITED, Kawasaki-shi, Kanagawa (JP)

(72) Inventor: Noboru Yoneoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 382 days.

(21) Appl. No.: 15/002,351

(22) Filed: Jan. 20, 2016

(65) Prior Publication Data

US 2016/0212427 A1     Jul. 21, 2016

(30) Foreign Application Priority Data

Jan. 21, 2015    (JP) ................................ 2015-009858

(51) Int. Cl.
*H04N 19/124*      (2014.01)
*H04N 19/61*       (2014.01)
(Continued)

(52) U.S. Cl.
CPC ......... *H04N 19/124* (2014.11); *H04N 19/147* (2014.11); *H04N 19/176* (2014.11);
(Continued)

(58) Field of Classification Search
None
See application file for complete search history.

(56) References Cited

U.S. PATENT DOCUMENTS

2009/0175331 A1*   7/2009   Karczewicz ......... H04N 19/176
                                                   375/240.03
2013/0108185 A1*   5/2013   Kenji ..................... G06T 9/007
                                                   382/250
(Continued)

FOREIGN PATENT DOCUMENTS

JP        2011-514055       4/2011
JP        2011-176483       9/2011
(Continued)

*Primary Examiner* — William C Vaughn, Jr.
*Assistant Examiner* — Joseph Daniel A Towe
(74) *Attorney, Agent, or Firm* — Fujitsu Patent Center

(57) ABSTRACT

A video encoding apparatus determines whether to substitute all quantized coefficients in a target coefficient group by zero, on the assumption that the subsequent coefficient groups include one or more quantized coefficients that are not zero, the target coefficient group being sequentially selected from the lowest-frequency among coefficient groups included in a block serving as a unit in orthogonal transform, and determines, for each coefficient group sequentially from the lowest-frequency coefficient group, whether to update, to a first quantized-coefficient candidate that is not zero and corresponding to the highest frequency in the coefficient group on the assumption that all the quantized coefficients in the subsequent coefficient groups are zero, a second quantized-coefficient candidate, which is already obtained, based on comparison between the first candidate and the second candidate in terms of a comparison cost obtained by subtracting a coding error related to the subsequent coefficient groups from a cost.

5 Claims, 15 Drawing Sheets

(51) Int. Cl.
*H04N 19/176* (2014.01)
*H04N 19/65* (2014.01)
*H04N 19/593* (2014.01)
*H04N 19/147* (2014.01)
*H04N 19/18* (2014.01)
*H04N 19/19* (2014.01)
*H04N 19/96* (2014.01)

(52) U.S. Cl.
CPC ............ *H04N 19/18* (2014.11); *H04N 19/19* (2014.11); *H04N 19/593* (2014.11); *H04N 19/61* (2014.11); *H04N 19/65* (2014.11); *H04N 19/96* (2014.11)

(56) References Cited

U.S. PATENT DOCUMENTS

| | | | |
|---|---|---|---|
| 2013/0128985 A1 | 5/2013 | He et al. | |
| 2014/0086314 A1* | 3/2014 | Hebel | H04N 19/70 375/240.04 |
| 2015/0030076 A1* | 1/2015 | Kapasi | H04N 19/56 375/240.16 |

FOREIGN PATENT DOCUMENTS

| | | | |
|---|---|---|---|
| JP | 2011176483 A | * | 9/2011 |
| JP | 2011176483 A | * | 9/2011 |
| JP | 2013-110740 | | 6/2013 |

* cited by examiner

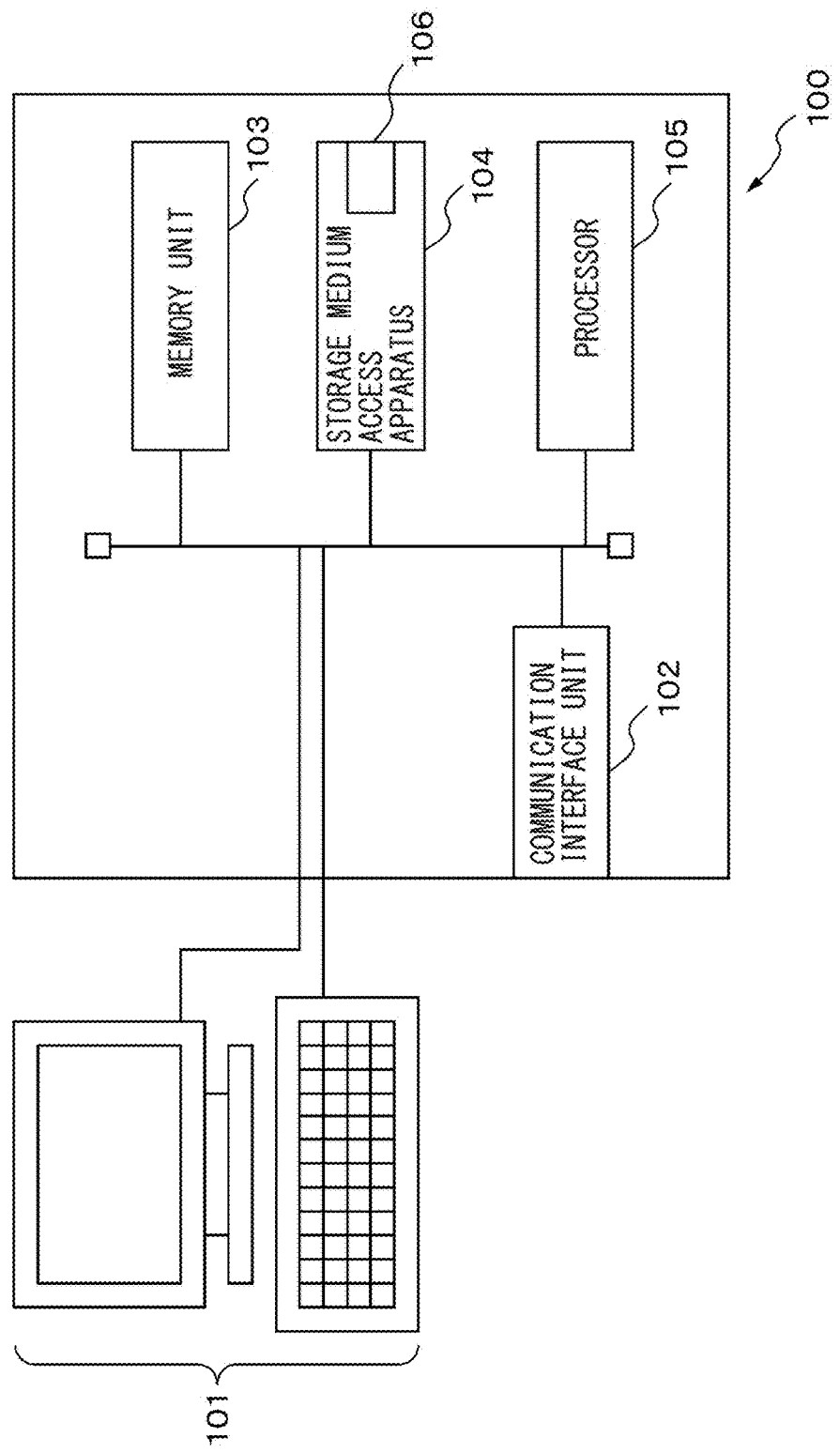

VIDEO ENCODING APPARATUS AND VIDEO ENCODING METHOD

CROSS-REFERENCE TO RELATED APPLICATION

This application is based upon and claims the benefit of priority of the prior Japanese Patent Application No. 2015-009858, filed on Jan. 21, 2015, and the entire contents of which are incorporated herein by reference.

FIELD

The embodiments discussed herein are related to a video encoding apparatus and a video encoding method.

BACKGROUND

The size of video data is normally large. For this reason, devices handling video data normally encode and thereby compress the video data before transmitting the video data to a different device or storing the video data in a storage device. Widely used video coding schemes are Moving Picture Experts Group phase 2 (MPEG-2), MPEG-4, and H.264 MPEG-4 Advanced Video Coding (H.264 MPEG-4 AVC) standardized by the International Organization for Standardization/International Electrotechnical Commission (ISO/IEC). In addition, High Efficiency Video Coding (HEVC, MPEG-H/H.265) is standardized as a new coding standard.

Consideration has been made to use, in such a coding scheme, the rate distortion optimized quantization (RDOQ) for the purpose of optimizing the balance between the quality of video obtained by decoding encoded video data and the compression efficiency (refer to, for example, Japanese Laid-open Patent Publication No. 2011-176483, Published Japanese Translation of PCT International Publication for Patent Application (Kohyo) No. 2011-514055, and Japanese Laid-open Patent Publication No. 2013-110740).

In RDOQ, an orthogonal transform coefficient, which is obtained by orthogonally transforming a prediction error signal of each pixel of each block obtained by dividing each picture included in video data, is quantized in such a way so as to determine a quantized coefficient possible to minimize the coding cost taking into account both a coding error and an amount of coding.

SUMMARY

In the techniques disclosed in the above patent documents, the following processes are performed: a process for determining the position of the highest-frequency quantized coefficient among the quantized coefficients that are not zero (referred to as a final coefficient below) for each block serving as a unit in orthogonal transform; and a process for optimizing the quantized coefficients individually or on a group-by-group basis. Among the two processes, the process for determining the position of final coefficient is carried out by use of the corresponding quantized coefficients that have been optimized. For this reason, the process for optimizing the quantized coefficients and the process for determining the position of each final coefficient are carried out as a so-called two-pass process. This reduces the throughput of video data coding.

In addition to the above, broadcasting of moving data having an extremely large number of pixels per picture, for example, 4K (3840 pixels by 2160 pixels) or 8K (7680 pixels by 4320 pixels) has recently been considered. A larger number of pixels per picture either increases the time for coding or calls for a high-performance computing unit, which is likely to be more expensive. Therefore, a decrease in coding throughput is not desirable. In particular, in broadcasting requiring as little delay as possible, as in real-time broadcasting, decrease in throughput may prevent coding of video data in time, possibly causing a problem.

According to one embodiment, a video encoding apparatus is provided. A video encoding apparatus includes a processor configured to divide a plurality of orthogonal transform coefficients included in each of a plurality of blocks into a plurality of coefficient groups each of which includes a predetermined number of the orthogonal transform coefficients, the plurality of blocks being obtained by dividing a picture included in a video, the plurality of orthogonal transform coefficients being obtained by orthogonally transforming, for each block, a prediction error signal obtained on the basis of difference between a value of each pixel of the picture and a prediction signal of the pixel; determine, for each of the predetermined number of orthogonal transform coefficients included in a target coefficient group from among the plurality of coefficient groups, a candidate possible to minimize a cost obtained on the basis of a coding error and an amount of coding among a plurality of quantized-coefficient candidates to be used for quantizing the orthogonal transform coefficient, to be a quantized coefficient of the orthogonal transform coefficient, the target coefficient group being selected from among the plurality of coefficient groups sequentially from the coefficient group including the orthogonal transform coefficients corresponding to lowest frequencies; determine, for a target coefficient group, whether to substitute all the predetermined number of quantized coefficients included in the target coefficient group by zero, on the assumption that a quantized coefficient that is not zero is included in the coefficient group corresponding to higher frequencies than those of the target coefficient group, the target coefficient group being selected from among the plurality of coefficient groups sequentially from the coefficient group including the orthogonal transform coefficients corresponding to the lowest frequencies; determine, for a target coefficient group, a first candidate for the quantized coefficient corresponding to a highest frequency among the quantized coefficients that are included in the target coefficient group and are not zero, on the assumption that all the quantized coefficients included in the coefficient groups corresponding to higher frequencies than those of the target coefficient group are zero, the target coefficient group being selected from among the plurality of coefficient groups sequentially from the coefficient group including the orthogonal transform coefficients corresponding to the lowest frequencies; calculate the coding error of the coefficient groups from the coefficient group adjacent to the coefficient group including a second candidate for the quantized coefficient on a higher frequency side to the coefficient group including the first candidate, the second candidate being the quantized coefficient with the highest frequency among the quantized coefficients not being zero, obtained for the coefficient group corresponding to lower frequencies than those of the coefficient group including the first candidate; update the second candidate to the first candidate when a comparison cost obtained by subtracting the coding error of the coefficient group corresponding to higher frequencies than those of the coefficient group including the first candidate from the cost obtained for the first candidate is lower than a value obtained by adding the coding error to the comparison cost calculated for the second candidate, and determine the second candidate at time when the second candidate for the coefficient group corresponding to highest frequencies among the plurality of coefficient groups is updated, to be the quantized coefficient that is not zero and corresponds to a highest frequency; and calculate the coding error of the coefficient groups from the coefficient group adjacent to the coefficient group including the second candidate on a higher frequency side to the coefficient group including the first candidate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram illustrating a configuration of a computer capable of performing a video encoding process according to any one of the embodiment and modified examples.

DESCRIPTION OF EMBODIMENTS

Figure 1:
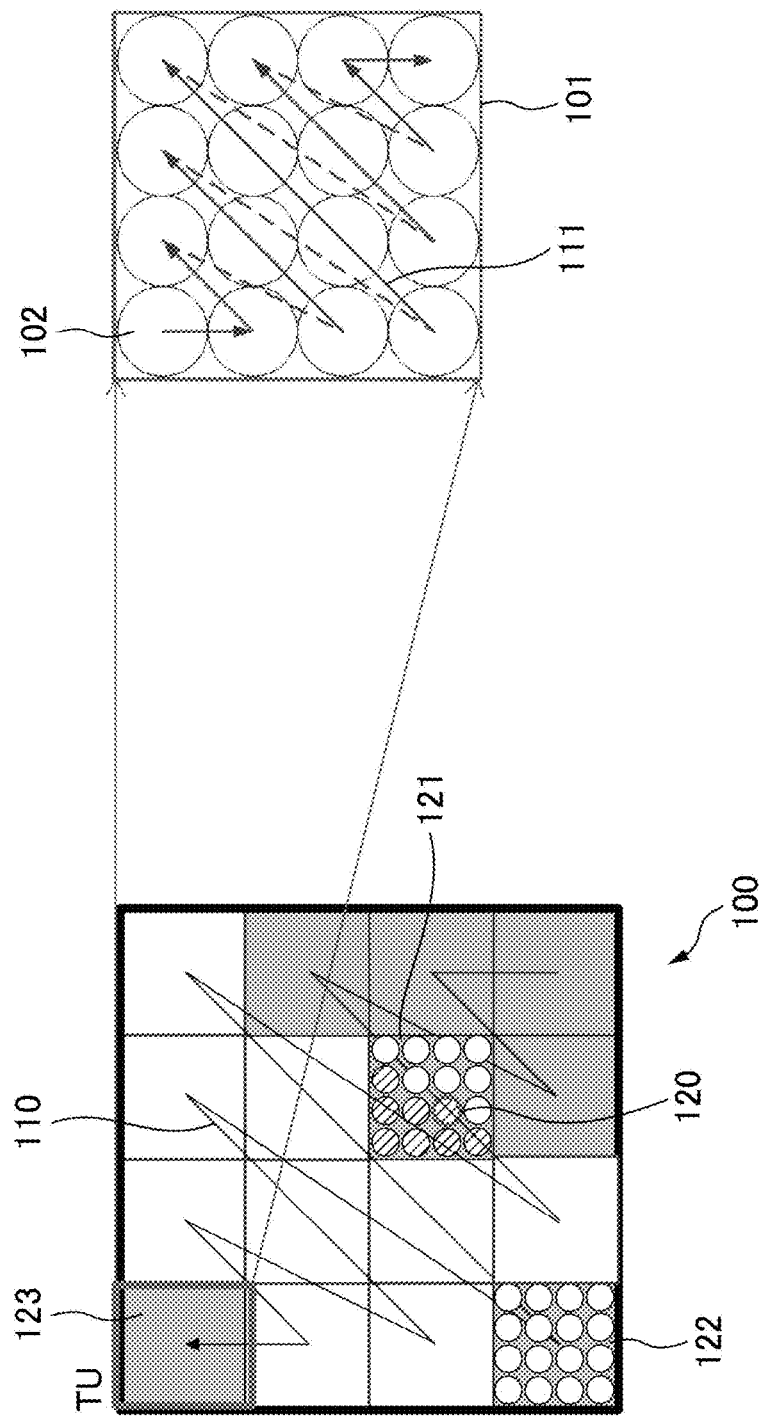
FIG. 1 is a diagram illustrating a relationship between a block serving as a unit in orthogonal transform and coefficient groups.

A video encoding apparatus is described below with reference to the drawings. The video encoding apparatus performs RDOQ on each block serving as a unit in orthogonal transform, to thereby optimize the quantized coefficients included in the block. In the following description, "block" means a block serving as a unit in orthogonal transform unless otherwise noted. First, to facilitate the understanding, description is given of a procedure by which the quantized coefficients in a block are optimized by a two-pass process employing the RDOQ.

In the RDOQ, the following three kinds of processes are carried out for each block.
(1) Optimization of quantized coefficients
(2) Optimization of quantized coefficient groups
(3) Determination of final-coefficient position (1) Optimization of Quantized Coefficients This process is carried out for each orthogonal transform coefficient in each block sequentially from the lowest-frequency orthogonal transform coefficient. The video encoding apparatus determines, for example, three quantized-coefficient candidates for a target orthogonal transform coefficient and calculates, for each candidate, the coding cost by taking into account both a coding error, i.e., distortion, and an amount of coding, i.e., rate, according to the following equation. For convenience, such a coding cost, which is determined by taking into account both distortion and rate, is referred to as an RD cost below. On the basis of the calculation, the video encoding apparatus determines the candidate having the smallest RD cost, as the quantized coefficient of the target orthogonal transform coefficient.

$$RDCost = Distortion + \lambda \cdot CBits \quad (1)$$

Wherein, Distortion and CBits respectively denote the error between the target orthogonal transform coefficient and the corresponding quantized coefficient (referred to simply as "coding error" below) and the estimated value of the amount of coding. $\lambda$ denotes an undetermined Lagrangian multiplier. RDcost denotes an RD cost.

As quantized-coefficient candidates, zero, coeff, which is a value obtained by quantizing the orthogonal transform coefficient on the basis of a quantization scale, and (coeff-1) are used, for example. Wherein, coeff and (coeff-1) correspond respectively to the value obtained by rounding up a value smaller than one and the value of rounding down the value smaller than one at a low-order bit to be deleted through quantization. The quantization scale is set, for example, on the basis of the desired amount of coding given for the picture including the block or a coding rate.

(2) Optimization of Quantized-Coefficient Groups

This process is carried out for each coefficient group, which includes four-by-four quantized coefficients. When the RD cost in the case of assuming that all the quantized coefficients included in a target coefficient group are zero is smaller than the RD cost in the case of using the original quantized coefficients, the video encoding apparatus sets all the quantized coefficients included in the target coefficient group at zero.

FIG. 1 is a diagram illustrating a relationship between a block serving as a unit in orthogonal transform and coefficient groups. In FIG. 1, a block 100 is a block serving as a unit in orthogonal transform and corresponds to a transform unit (TU) in HEVC, for example. Each subblock 101 in the block 100 is a coefficient group and includes four-by-four quantized coefficients 102. When a discrete cosine transform (DCT) is employed for orthogonal transform, the upper left end of the block 100 corresponds to the lowest frequency, and the lower right end of the block 100 corresponds to the highest frequency. In this case, for example, the optimization process of coefficient groups is carried out sequentially from the highest-frequency coefficient group as indicated by an arrow 110. The optimization process of individual quantized coefficients in each coefficient group is carried out sequentially from the lowest-frequency quantized coefficient as indicated by an arrow 111. Note that the optimization process of coefficient groups is not carried out for a coefficient group 121, which includes a final coefficient 120, a coefficient group 122, which originally consists of quantized coefficients each being zero, and a coefficient group 123, which is the lowest-frequency coefficient group, i.e., the coefficient group positioned at the upper left end.

(3) Determination of Final-Coefficient Position

This process is carried out for each of the quantized coefficients in each block sequentially from the highest-frequency quantized coefficient. In this process, the video encoding apparatus calculates the RD cost in the case of assuming that each quantized coefficient having an absolute value of one and an amount of coding CBits of a certain value or smaller, is substituted by zero sequentially from the highest-frequency quantized coefficient. The video encoding apparatus does not calculate the RD cost by substituting a quantized coefficient by zero for the quantized coefficient appearing first among the quantized coefficients having an absolute value of two or larger when the quantized coefficients are scanned from the highest-frequency quantized coefficient, and the subsequent quantized coefficients. The video encoding apparatus determines, as a final coefficient, the highest-frequency quantized coefficient among the quantized coefficients that are not zero in the state where the RD cost is the smallest, and sets zero to all the quantized coefficients corresponding to higher frequencies than that of the final coefficient.

Figure 2:
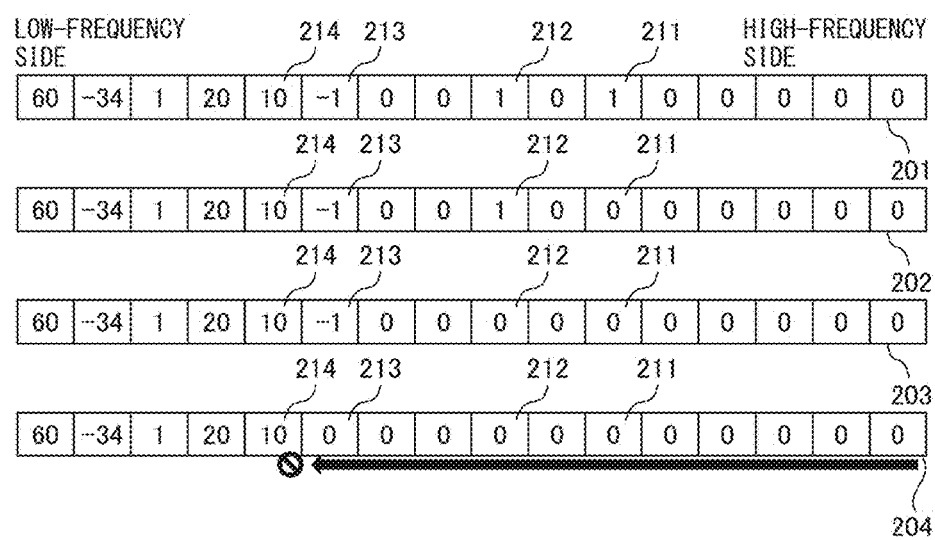
FIG. 2 is a diagram illustrating an example of a relationship between quantized coefficients in respective blocks that are arranged in an order according to frequency and the position of a corresponding final coefficient.

FIG. 2 is a diagram illustrating an example of a relationship between the quantized coefficients in respective blocks arranged according to frequency and a final-coefficient position. In FIG. 2, the numerical values in each block represent quantized coefficients. The quantized coefficients arranged closer to the right end of the block correspond to higher frequencies. In FIG. 2, the right end of each of block sequences 201 to 204 corresponds to the highest frequency, and the left end of each of the block sequences 201 to 204 corresponds to the lowest frequency. As illustrated in the block sequences 201 to 204, quantized coefficients 211, 212, and 213 are substituted by zero sequentially from the quantized coefficient 211, which is the highest-frequency quantized coefficient among the quantized coefficients each having an absolute value of one, followed by the quantized coefficients 212 and 213, each of which has an absolute value of one. Note that, since a quantized coefficient 214 has an absolute value not smaller than two, the quantized coefficient 214 and the quantized coefficients corresponding to lower frequencies than that of the quantized coefficient 214 are not substituted by zero. For example, when the RD cost calculated by substituting the quantized coefficient 211 and the quantized coefficient 212 by zero as illustrated in the block sequence 203 is the smallest, the quantized coefficient 213 is determined as a final coefficient.

As described above, calculation of RD costs and CBits in the process (3), which is carried out from the highest-frequency coefficient, is possible first after all the quantized coefficients are determined through the processes (1) and (2). For this reason, the processes (1) and (2) and the process (3) are carried out as a two-pass process in known techniques.

The inventor(s) decided to determine, for each coefficient group from the lowest-frequency, a final-coefficient candidate on the assumption that a final coefficient is included in the coefficient group. The inventor found out that, in this case, the RD costs of two coefficient groups each including a final-coefficient candidate can be compared without taking into account coding errors related to the quantized coefficients corresponding to higher frequencies than those of the two coefficient groups. Hence, the video encoding apparatus according to an embodiment sequentially carries out the above-described processes (1) to (3) for each coefficient group sequentially from the lowest-frequency coefficient group. The video encoding apparatus optimizes a target coefficient group on the assumption that a final coefficient is included in one of the coefficient groups subsequent to the target coefficient group. The video encoding apparatus determines, on the other hand, for the target coefficient group, a final-coefficient candidate on the assumption that a final coefficient is included in the target coefficient group. The video encoding apparatus compares the RD cost of the final-coefficient candidate in the target coefficient group, with the RD cost of the final-coefficient candidate of the entire block determined for the previous coefficient groups. When the RD cost of the final-coefficient candidate of the target coefficient group is lower than the RD cost of final-coefficient candidate of the entire block, the video encoding apparatus sets the final-coefficient candidate of the target coefficient group as the final-coefficient candidate of the entire block. The video encoding apparatus sets the final-coefficient candidate determined at the time when the processes are completed for all the coefficient groups, as the final coefficient. In this way, the video encoding apparatus enables the quantized-coefficient optimization based on the RDOQ to be a one-pass process.

In this embodiment, the video encoding apparatus encodes video data according to the HEVC. However, the video encoding apparatus may encode video data according to a different coding standard by which a picture is encoded by quantizing an orthogonal transform coefficient obtained by orthogonally transforming each prediction error signal of each of the blocks obtained by dividing the picture.

Figure 3:
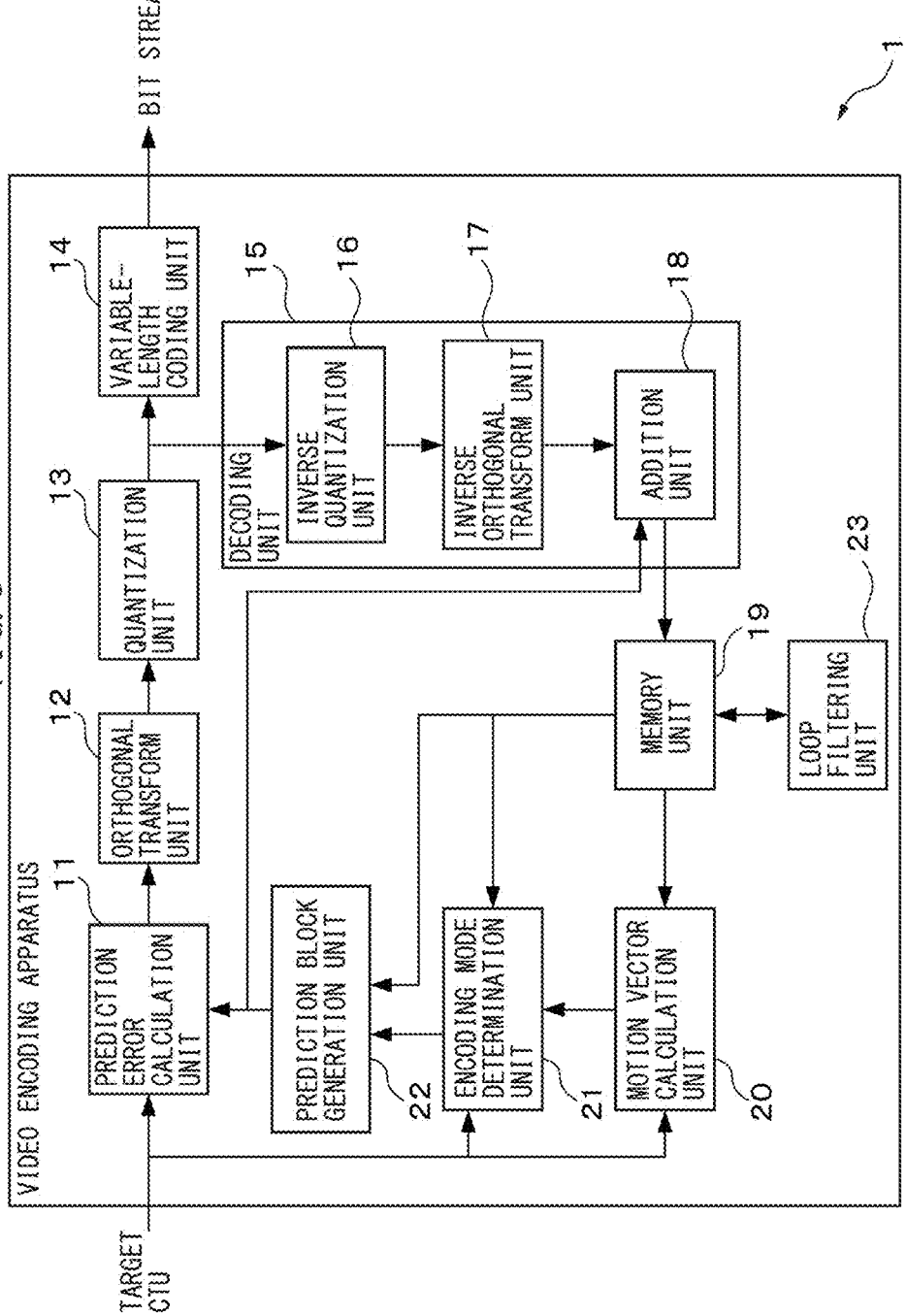
FIG. 3 is a diagram illustrating a schematic configuration of a video encoding apparatus according to an embodiment.

FIG. 3 is a diagram illustrating a schematic configuration of a video encoding apparatus according to the embodiment. A video encoding apparatus 1 includes a prediction error calculation unit 11, an orthogonal transform unit 12, a quantization unit 13, a variable-length coding unit 14, a decoding unit 15, a memory unit 19, a motion vector calculation unit 20, a encoding mode determination unit 21, a prediction block generation unit 22, and a loop filtering unit 23. The decoding unit 15 includes an inverse quantization unit 16, an inverse orthogonal transform unit 17, and an addition unit 18.

Each picture included in video data is divided into a plurality of coding tree units (CTUs) each serving as a unit in coding by a control unit (not illustrated), for example. The CTUs are sequentially input to the video encoding apparatus 1 according to the raster-scan order. The video encoding apparatus 1 performs a video coding process on each CTU.

The coding units (CU) included in a coding target CTU are sequentially input to the prediction error calculation unit 11. The prediction error calculation unit 11 calculates, for each CU in the coding target CTU, the difference between each transform unit (TU) in the CU and a corresponding prediction block generated by the prediction block generation unit 22. The prediction error calculation unit 11 sets the difference values corresponding to the respective pixels in the TU obtained through the difference calculation, as prediction error signals of the TU. Although the example of calculating the difference for each TU is described above, the prediction error calculation unit 11 may perform difference calculation for each CU or each prediction unit (PU).

The orthogonal transform unit 12 obtains, for each TU of the CU, orthogonal transform coefficients by orthogonally transforming the prediction error signals of the TU, each of the orthogonal transform coefficients representing the horizontal frequency component and the vertical frequency component of the prediction error signal. For example, the orthogonal transform unit 12 performs discrete cosine transform (DCT) on the prediction error signals as orthogonal transform, thereby obtaining DCT coefficients as the orthogonal transform coefficients.

The quantization unit 13 calculates, for each orthogonal transform coefficient obtained by the orthogonal transform unit 12 for each TU, a quantized coefficient by performing one-pass RDOQ according to the embodiment. The details of the process carried out by the quantization unit 13 are to be described later.

The quantization unit 13 outputs the quantized coefficients of each TU to the variable-length coding unit 14 and the decoding unit 15.

The variable-length coding unit 14 performs variable-length coding on each quantized coefficient. The variable-length coding unit 14 also performs variable-length coding on information including the motion vector used for creating the prediction block. Then, the variable-length coding unit 14 outputs a bit stream including encoded bits obtained as a result of the variable-length coding, the encoded bits being arranged in a predetermined order according to an employed coding standard. The variable-length coding unit 14 employs an arithmetic coding process, such as the context-based adaptive binary arithmetic coding (CABAC), as a variable-length coding scheme to be performed on each quantized coefficient. The variable-length coding unit 14 may employ Huffman coding, such as the context-based adaptive variable length coding (CAVLC), for information other than quantized coefficients. The variable-length coding unit 14 outputs the obtained bit stream.

The decoding unit 15 generates, from the quantized orthogonal transform coefficients of each TU, a reference block to be referred to, for example, for the coding of the CU or the like carried out subsequent to the coding of the TU, and stores the reference block in the memory unit 19. Specifically, the inverse quantization unit 16 of the decoding unit 15 inversely quantizes the quantized coefficients of each TU. Then, the inverse quantization unit 16 outputs the restored orthogonal transform coefficients of each TU to the inverse orthogonal transform unit 17 of the decoding unit 15.

The inverse orthogonal transform unit 17 performs inverse orthogonal transform on the restored orthogonal transform coefficients of each TU. For example, when the orthogonal transform unit 12 performs DCT as orthogonal transform, the inverse orthogonal transform unit 17 performs inverse DCT as inverse orthogonal transform. Through the inverse orthogonal transform, the inverse orthogonal transform unit 17 restores, for each TU, each prediction error signal including the information equivalent to the prediction error signal before the coding. The inverse orthogonal transform unit 17 outputs the restored prediction error signals of each TU, to the addition unit 18 of the decoding unit 15.

The addition unit 18 generates, for each TU, a reference block to be used for generating a prediction block for a CU or the like to be encoded later, by adding the restored prediction error signals to the respective pixel values of the prediction block of the TU. Upon generation of each reference block, the addition unit 18 stores the generated reference block in the memory unit 19.

The memory unit 19 temporarily stores each reference block received from the addition unit 18. When the data of all the reference blocks included in the single picture is written in the memory unit 19, a reference picture to be referred to for encoding a different picture is formed by combining all the reference blocks. The memory unit 19 provides the reference blocks or the reference picture to the motion vector calculation unit 20, the encoding mode determination unit 21, the prediction block generation unit 22, and the loop filtering unit 23.

To generate a prediction block for inter-predictive coding, the motion vector calculation unit 20 obtains a motion vector for each PU of the coding target CU by use of the PU and the reference picture read from the memory unit 19. The motion vector represents a spatial moving amount between the PU and an area of the reference picture most similar to the PU.

The motion vector calculation unit 20 performs block-matching on the PU and each reference picture and thereby determines the reference picture most similar to the PU and the position of the corresponding area in the reference picture. The motion vector calculation unit 20 sets, as a motion vector, the horizontal and vertical movement amounts between the position of the PU in the coding target picture and the corresponding area in the reference picture most similar to the PU. The motion vector calculation unit 20 passes the obtained motion vector and the identification information on the reference picture to the encoding mode determination unit 21 and the prediction block generation unit 22.

The encoding mode determination unit 21 determines CU, PU, and TU sizes for dividing the coding target CTU and a predictive coding mode to be used for generating prediction blocks. The encoding mode determination unit 21 determines a predictive coding mode for each CU in the coding target CTU, for example, on the basis of information indicating the type of the coding target picture including the coding target CTU acquired from the unillustrated control unit. When the type of the coding target picture is I picture, for which only the intra-predictive coding mode can be used, the encoding mode determination unit 21 selects the intra-predictive coding mode as the coding mode to be used and selects the prediction mode possible to minimize the amount of coding. When the type of the coding target picture is P picture or B picture, the encoding mode determination unit 21 selects, for example, either the inter-predictive coding mode or the intra-predictive coding mode as the coding mode as the coding mode to be used. A P picture can be applied to unidirectional inter-predictive coding, and a B picture can be applied to either bidirectional or unidirectional inter-predictive coding.

The encoding mode determination unit 21 calculates the coding cost, which is an estimated value of the amount of coding of the coding target CTU, for each combination of possible CU, PU, and TU sizes and a possible predictive coding mode. For example, in the case of inter-predictive coding mode, the encoding mode determination unit 21 calculates the coding cost for each combination of the CU, PU, and TU sizes for dividing the CTU and a vector mode specifying a method for generating a prediction vector of a motion vector. In the case of the intra-predictive coding mode, the encoding mode determination unit 21 calculates the coding cost for each combination of the CU, PU, and TU sizes used for dividing the CTU and a prediction mode.

To calculate the coding cost, for example, for a target combination, the encoding mode determination unit 21 calculates the total SAD of pixel difference absolute values for the TU included in the combination, according to the following equation.

$$SAD = \Sigma |OrgPixel - PredPixel|$$

Wherein, OrgPixel denotes the value of a pixel included in a target block, e.g., a target TU, of the coding target picture, and PredPixel denotes the value of a corresponding pixel included in the prediction block corresponding to the target block. The prediction block is generated from an encoded reference picture or another encoded block according to the predictive coding mode of the target combination.

The encoding mode determination unit 21 calculates a coding cost Cost for the target combination according to the following equation.

$$Cost = \Sigma SAD + \lambda R$$

Wherein, ΣSAD expresses the sum of the totals SAD calculated for the respective TUs included in the coding target CTU. R denotes the estimated value of the amount of coding related to information other than the orthogonal transform coefficient, such as a motion vector, and a flag indicating the prediction mode. λ denotes an undetermined Lagrangian multiplier.

The encoding mode determination unit 21 may calculate, instead of the total SAD, a total SATD of the absolute values of the respective pixels obtained as a result of Hadamard transform performed on a difference image of the target block and the prediction block.

The encoding mode determination unit 21 selects a predictive coding mode (intra-predictive coding mode or inter-predictive coding mode) to be used for each CU of the coding target CTU in such a way as to minimize the coding cost. The encoding mode determination unit 21 selects the prediction mode or the vector mode possible to minimize the coding cost for each combination of a PU and a TU of each CU.

The encoding mode determination unit 21 notifies the orthogonal transform unit 12 and the prediction block generation unit 22 of the selected combination of the CU, PU, and TU sizes and the predictive coding mode.

The prediction block generation unit 22 generates a prediction block of each TU on the basis of the combination of the CU, PU, and TU sizes and the predictive coding mode selected by the encoding mode determination unit 21. For example, when a CU is applied to the inter-predictive coding, the prediction block generation unit 22 performs, for each PU of the CU, motion compensation on a reference picture read from the memory unit 19, on the basis of a motion vector provided by the motion vector calculation unit 20. The prediction block generation unit 22 then generates a motion-compensated prediction block for inter-predictive coding.

When a coding target CU is applied to intra-predictive coding, the prediction block generation unit 22 generates a prediction block for each TU by applying the prediction mode selected for the corresponding PU of the coding target CU. The prediction block generation unit 22 passes the generated prediction blocks to the prediction error calculation unit 11.

The loop filtering unit 23 smooths the pixel values of the reference blocks stored in the memory unit 19 by performing deblocking filtering over the boundary between each two adjacent reference blocks, in order to reduce blocking noise. The pixel values obtained as a result of the deblocking filtering serve as the values of the corresponding pixels of the reference picture to be referred to for encoding a picture subsequent to the coding target picture. The loop filtering unit 23 may carry out a different kind of noise reduction, for example, a sample adaptive offset process, for the reference block. The loop filtering unit 23 writes the pixel values of the reference block obtained through filtering, to the memory unit 19.

Figure 4:
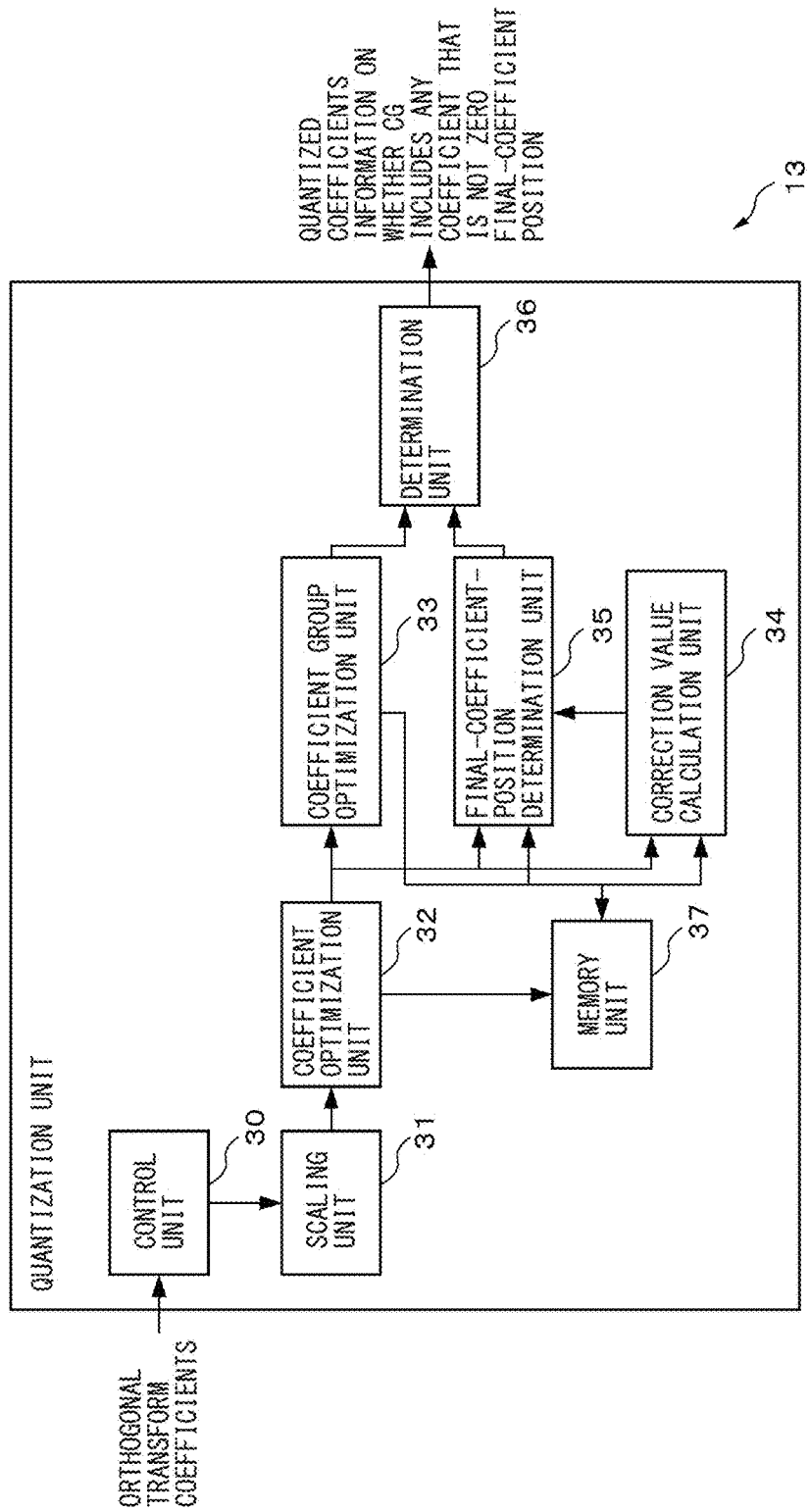
FIG. 4 is a diagram illustrating a schematic configuration of a quantization unit.

The details of the processing performed by the quantization unit 13 are described below. FIG. 4 is a diagram illustrating a schematic configuration of the quantization unit 13. The quantization unit 13 includes a control unit 30, a scaling unit 31, a coefficient optimization unit 32, a coefficient group optimization unit 33, a correction value calculation unit 34, a final-coefficient-position determination unit 35, a determination unit 36, and a memory unit 37.

The control unit 30 is an example of a division unit and divides, upon each input of a TU for which orthogonal transform coefficients are calculated, the TU into coefficient groups. In this embodiment, each coefficient group includes four-by-four orthogonal transform coefficients, as described above. In this embodiment, the quantization unit 13 carries out the above-described processes (1) to (3) for each coefficient group sequentially from the lowest-frequency coefficient group. To enable this, the control unit 30 passes the coefficient groups sequentially from the lowest-frequency coefficient group, to the scaling unit 31.

Figure 5:
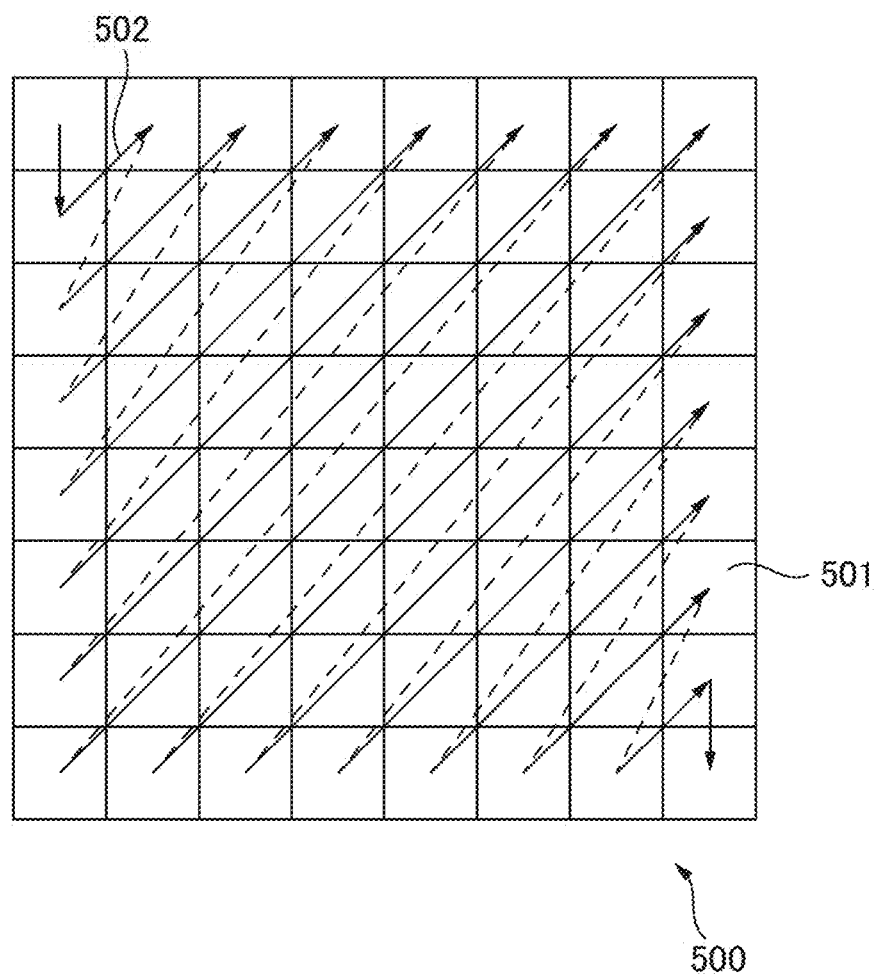
FIG. 5 is a diagram illustrating an order in which coefficient groups are processed.

FIG. 5 is a diagram illustrating an order in which coefficient groups are processed. In this example, a TU 500 includes 32-by-32 orthogonal transform coefficients; accordingly, 8-by-8 coefficient groups 501 are set in the TU 500. When DCT is employed as orthogonal transform, the orthogonal transform coefficient positioned at the upper left end of the TU 500 represents the lowest-frequency (direct-current) component, and the orthogonal transform coefficient positioned at the lower right end of the TU 500 represents the highest-frequency component. Hence, the quantization unit 13 performs the processes (1) to (3) on the coefficient groups 501 in the order indicated by an arrow 502.

Every time a coefficient group is input to the scaling unit 31, the scaling unit 31 creates, for each orthogonal transform coefficient included in the coefficient group, a list of candidates for a quantized coefficient, which is a value to be obtained by quantizing the orthogonal transform coefficient. In this embodiment, the scaling unit 31 creates a list including three quantized-coefficient candidates, for each orthogonal transform coefficient. The candidates are {0, coeff-1, coeff}. The candidate coeff is calculated for each orthogonal transform coefficient on the basis of the HEVC, for example, according to the following equations.

$$coeff = (l_i + \alpha) >> qshift \quad (2)$$

$$l_i = |C_i| \cdot Q(QP\%6, i)$$

$$Q(QP\%6, i) = \frac{(QuantScales[QP\%6] << 4)}{ScalingList[type][i]}$$

$$QuantScales[6] = \{26214, 23302, 20560, 18396, 16384, 14564\}$$

$$qshift = 14 + (QP/6) + (15 - BitDepth - \log_2 TUSize)$$

$$\log_2 TUSize : 2 \ (TU4 \times 4)$$
$$3 \ (TU8 \times 8)$$
$$4 \ (TU16 \times 16)$$
$$5 \ (TU32 \times 32)$$

$C_i$ denotes the i-th orthogonal transform coefficient from the lowest-frequency orthogonal transform coefficient, Q(QP %6,i) denotes a quantization scale used for the i-th orthogonal transform coefficient. QP denotes a quantization parameter used for the TU input to the quantization unit 13, and the quantization parameter is determined according to a desired bit rate, for example. QuantScales[ ] denotes a list of quantization scales. ScalingList[type][i] denotes a list of scales set for each type for the i-th orthogonal transform coefficient. Type is determined on the basis of the TU size input to the quantization unit 13, the predictive coding mode employed for the CU including the TU, and the component represented by the coding target TU, i.e., luminance component or color-difference component, for example. Qshift denotes a quantization shift value, BitDepth denotes the bit accuracy per pixel. α denotes a rounding value and set at '1<<(qshift-1)', for example. The operator '>>' represents bit shift to a lower-order bit, and the operator '<<' represents bit shift to a higher-order bit.

The scaling unit 31 passes the quantized-coefficient candidates of each orthogonal transform coefficient included in the coefficient group, to the coefficient optimization unit 32.

The coefficient optimization unit 32 determines, for each orthogonal transform coefficient included in each coefficient group, the candidate possible to minimize the RD cost from among the quantized-coefficient candidates of the orthogonal transform coefficient, and sets the candidate as the quantized coefficient of the orthogonal transform coefficient.

In this embodiment, the coefficient optimization unit 32 calculates the RD cost of each orthogonal transform coefficient, for each quantized-coefficient candidate. For the calculation, the coefficient optimization unit 32 uses the following equations in order to determine the quantized coefficients of the respective orthogonal transform coefficients in parallel without depending on the positions of the orthogonal transform coefficients in the coefficient group.

$$J(l_i^{test}) = err(C_i, l_i^{test}) + \lambda \cdot R[i] \quad (3)$$

$$err(C_i, l_i^{test}) = \frac{((|C_i| \cdot Q(QP\%6, i)) - (l_i^{test} << qshit))^2}{ErrScale}$$

$$ErrScale = (2^{2(15-BitDepth-Log_2TUSize)} \cdot Q(QP\%6, i)^2 \cdot 2^{2(BitDepth-8)} + 2^{BitScale-1}) >> BitScale \quad (4)$$

$J(l_i^{test})$ denotes the RD cost of a quantized-coefficient candidate $l_i^{test}$ (={0, coeff-1, coeff}) of the i-th orthogonal transform coefficient from the lowest-frequency orthogonal transform coefficient. $Err(C_i, l_i^{test})$ denotes the square error between the i-th orthogonal transform coefficient $C_i$ and the quantized-coefficient candidate $l_i^{test}$. ErrScale denotes an error scale. BitScale denotes decimal-bit accuracy. λ denotes an undetermined Lagrangian multiplier, and R[i] denotes the amount of coding of the i-th coefficient. In this embodiment, the amount of coding R[i] is calculated as a value corresponding to the bin number prior to obtaining a code according to the CABAC by the variable-length coding unit 14. Specifically, the amount of coding R[i] is calculated according to the following equations.

R[i]=coeffN×NCost[i] coeffN×NCost[i]=sigCoeffFlag[i]+coeffAbsLevelGreater1Flag[i]+coeffAbsLevelGreater2Flag[i]+coeffAbsLevelRemainig[i]+coeffSignFlag[i]  (4)

Wherein, sigCoeffFlag[i], coeffAbsLevelGreater1Flag[i], coeffAbsLevelGreater2Flag[i], coeffAbsLevelRemaining[i], coeffSignFlag[i] are the amounts of coding for the syntax elements of the i-th coefficient and are defined in the HEVC. Among these, sigCoeffFlag[i] denotes the amount of coding of information indicating whether each quantized coefficient corresponding to frequencies lower than that of the final-coefficient position in the quantized coefficient sequence in which the quantized coefficients of the processing target coefficient group are arranged sequentially from the highest-frequency quantized coefficient is zero, and is set at one. coeffAbsLevelGreater1Flag[i] is an amount of coding of the information indicating whether the absolute value of the quantized coefficient is larger than one, and is set at one. CoeffAbsLevelGreater2Flag[i] denotes the amount of coding of the information indicating whether the absolute value of the quantized coefficient is larger than two, and is set at zero. CoeffAbsLevelRemaining[i] denotes the amount of coding of the binarized information on the quantized coefficient having an absolute value larger than two, and is set at zero when $l_i^{test}$ is one or smaller. In contrast, when $l_i^{test}$ is two or larger, the amount of coding CoeffAbsLevelRemaining[i] corresponds to the number of bits when $l_i^{test}$ is applied to truncated Rice Golomb coding. A RiceParam value used for the coding is the same for the entire coefficient group and may be set at any one of the values zero to four. CoeffSignFlag[i] denotes the amount of coding of the information indicating the sign of the quantized coefficient, i.e., positive or negative, and is set at zero.

The coefficient optimization unit 32 determines the candidate possible to minimize the RD cost $J(l_i^{test})$ for each orthogonal transform coefficient and sets the candidate as the quantized coefficient of the orthogonal transform coefficient. The coefficient optimization unit 32 stores the obtained quantized coefficients in the memory unit 37 and passes the quantized coefficients to the coefficient group optimization unit 33, the correction value calculation unit 34, and the final-coefficient-position determination unit 35. The coefficient optimization unit 32 also stores, for each orthogonal transform coefficient, the coding error err($C_i$,0) calculated for zero, which is one of the quantized-coefficient candidates, in the memory unit 37.

The coefficient group optimization unit 33 determines, for each coefficient group sequentially from the lowest-frequency coefficient group, whether all the quantized coefficients included in the coefficient group are to be set at zero. In other words, the coefficient group optimization unit 33 performs the above-described process (2) on each coefficient group sequentially from the lowest-frequency coefficient group, although not performing the process (2) on the lowest-frequency coefficient group.

Since coefficient group optimization is not to be performed on the coefficient group including the final coefficient, the coefficient group optimization unit 33 assumes that the final coefficient is included in one of the coefficient groups corresponding to higher frequencies than that of the target coefficient group. On the basis of this assumption, the coefficient group optimization unit 33 calculates an RD cost CGCost(m) of the entire target coefficient group when all the quantized coefficients in the target coefficient group are maintained and the RD cost CGCost0(m) of the entire coefficient group when all the quantized coefficients in the target coefficient group are substituted by zero. The coefficient group optimization calculation unit 33 calculates the RD costs CGCost(m) and CGCost0(m), for example, according to the following equations in such a way as to avoid any dependence between coefficient groups.

$CGCost(m) = \Sigma_{cg} err(C_i, l_i) + \lambda \cdot CBitsCG(m)$ $CGCost0(m) = \Sigma_{cg} err(C_i, 0) + \lambda \cdot CBitsCG0(m)$ $CBitsCG(m) = \Sigma\ coeffN \times NCost[i] + CGBits(m)$ $CBitsCG0(m) = 0 + CGBits(m)$ $CGBits(m) = sigCoeffFlag + codedSubBlockFlag$  (5)

Wherein, m denotes the number of the target coefficient group in the order counted from the lowest-frequency coefficient group. $\Sigma_{cg}err(C_i,l_i)$ expresses the coding error of the entire target coefficient group. $C_i$ and $l_i$ respectively denote the i-th orthogonal transform coefficient in the target coefficient group and the corresponding quantized coefficient. Wherein, $err(C_i,l_i)$ is calculated according to a similar calculation formula as that for $err(C_i,l_i^{test})$ presented in equation (3).

CBitsCG(m) denotes the amount of coding of the target coefficient group when the quantized coefficients maintained. CBitsCG0($m$) is the amount of coding of the target coefficient group when all the quantized coefficients in the target coefficient group are substituted by zero. In equation of CBitsCG(m), coeffN×NCost[i] is calculated according to the same calculation formula as that for coeffN×NCost[i] presented in equation (4). The coefficient group optimization unit 33 may calculate CBitsCG(m) by use of the value of coeffN×NCost[i] calculated by the coefficient optimization unit 32 at the time of determining the quantized coefficients.

CGBits(m) is the amount of coding of the information indicating whether the coefficient group includes any quantized coefficient that is not zero, the amount of coding being obtained on the basis of the syntax elements of the coefficient group. CGBits(m) corresponds to the bin number prior to calculating a code according to the CABAC by the variable-length coding unit 14. SigCoeffFlag denotes the amount of coding of the syntax element indicating whether only the lowest-frequency quantized coefficient in the coefficient group is not zero, and is set at zero. CodedSubBlock-Flag denotes the amount of coding of a syntax element indicating whether the coefficient group includes one or more quantized coefficients that are not zero, and is set at one.

When CGCost0(m) is smaller than CGCost(m) with respect to the target coefficient group, the coefficient group optimization unit 33 determines to substitute all the quantized coefficients included in the target coefficient group by zero and substitutes all the quantized coefficients by zero. In contrast, when CGCost0(m) is larger than or equal to CGCost(m), the coefficient group optimization unit 33 determines to maintain the quantized coefficients included in the target coefficient group. Then, the coefficient group optimization unit 33 stores the flag indicating the determination result in the memory unit 37 and notifies the determination unit 36 of the flag.

The correction value calculation unit 34 calculates, for each coefficient group, an RD cost correction value to be used for comparison of the RD costs between the coefficient groups.

Refer to equation (1) again. When a final-coefficient position is denoted by k, an RD cost TUCost(k) of the entire TU is expressed by the following equation.

$$\text{TUCost}(k)=\Sigma_{i=0}^{i=k}err(C_i,l_i)+\Sigma_{i=k+1}^{i=n}err(C_i,l_i)+\lambda\cdot CBits(k) \quad (6)$$

In equation (6), the first term of the right-hand side expresses the coding errors of the respective quantized coefficients from the lowest-frequency quantized coefficient to the final coefficient, and the second term of the right-hand side expresses the coding errors of the respective quantized coefficients from the frequency position next to the final-coefficient position to the highest-frequency position. The quantized coefficients subsequent to the final-coefficient position are set at zero according to the definition. The third term of the right-hand side expresses the value obtained by multiplying the amount of coding of the entire TU by the undetermined Lagrangian multiplier. The first and third terms of the right-hand side are calculated on the basis of the process related to the lowest-frequency (i.e., zero) to k-th quantized coefficients. Assume that the final coefficient is included in the m-th coefficient group. In this case, the following equations are obtained by resolving the second term of the right-hand side of equation (6) into the coding error of the m-th coefficient group and the coding errors of the (m+1)-th and subsequent coefficient groups.

$$\begin{aligned}\text{TUCost}(k) &= \sum_{i=0}^{i=k}err(C_i,l_i) + \sum_{i=k+1}^{i=n}err(C_i,0) + \lambda\cdot CBits(k) \\ &= \sum_{i=0}^{i=k}err(C_i,l_i) + \sum_{i=k+1}^{i=16(m+1)-1}err(C_i,0) + \\ & \quad \sum_{i=16(m+1)}^{i=n}err(C_i,0) + \lambda\cdot CBits(k) \\ &= \sum_{t=0}^{t=m}CGDist(t) + \\ & \quad \sum_{t=m+1}^{t=n/16}CGDist0(t) + \lambda\cdot CBits(k)\end{aligned} \quad (7)$$

Wherein, $\Sigma CGDist(t)[t=0,\ldots,m]$ expresses the coding errors of the zeroth to m-th coefficient groups. $\Sigma CGDist0(t)$ $[t=m+1,\ldots,n/16]$ expresses the coding errors of the (m+1)-th and subsequent coefficient groups, i.e., the coding errors of the coefficient groups in each of which all the quantized coefficients are set at zero.

As expressed in the following equation, Opt(m) is obtained by excluding the coding errors $\Sigma CGDist0(t)$ of the (m+1)-th and subsequent coefficient groups from TUCost(k).

$$\text{Opt}(m)=\Sigma_{t=0}^{t=m}CGDist(t)+\lambda\cdot CBits(k) \quad (8)$$

Although TUCost(k) is first calculated after the quantized coefficients of all the coefficient groups are obtained, Opt(m) is calculated by assuming that the final coefficient is included in the coefficient group m. The difference between the cost Opt(m) of the coefficient group m and the cost Opt(m+s) of a case assuming that a final coefficient k' is included in a coefficient group (m+s) (where s is an integer larger than or equal to one) is expressed as follows.

$$\text{Opt}(m)=\text{TUCost}(k)-\Sigma_{t=m+1}^{t=n/16}CGDist0(t)=\text{TUCost}(k)-\Sigma_{t=m+1}^{t=m+s}CGDist0(t)-\Sigma_{t=m+s+1}^{t=n/16}CGDist0(t)$$

$$\text{Opt}(m+s)=\text{TUCost}(k')-\Sigma_{t=m+s+1}^{t=n/16}CGDist0(t)$$

$$\therefore \text{Opt}(m+s)-\text{Opt}(m)=\text{TUCost}(k')-\text{TUCost}(k)+\Sigma_{t=m+1}^{t=m+s}CGDist0(t)$$

$$\text{TUCost}(k')-\text{TUCost}(k)=\text{Opt}(m+s)-\text{Opt}(m)-\Sigma_{t=m+1}^{t=m+s}CGDist0(t) \quad (9)$$

As expressed in equation (9), the difference between the RD cost TUCost(k') when the final coefficient k' is included in the coefficient group (m+s) and the RD cost TUCost(k) when the final coefficient k is included in the coefficient group m is equal to the value obtained by adding $\Sigma CGDist0$ (t) to the difference between the cost Opt(m+s) and the cost Opt(m). Wherein, $t=m+1,\ldots,m+s$. The cost Opt(m+s) and the cost Opt(m) are calculated by assuming that the final coefficient is included in the coefficient group (m+s), and the coefficient group m, respectively. Hence, even when the RD costs TUCost(k) and TUCost(k') cannot be calculated, the difference between TUCost(k) and TUCost(k') is calculated by obtaining Opt(m), Opt(m+s), and ΣCGDist0($t$) [t=m+1, . . . , m+s].

The correction value calculation unit 34 calculates ΣCGDist0($t$)[t=m+1, . . . , m+s] as a correction value. The correction value ΣCGDist0($t$)[t=m+1, . . . , m+s] is the sum of the coding errors err($C_i$,0) obtained by assuming that all the quantized coefficients included in the coefficient groups (m+1) to (m+s) are zero. The correction value calculation unit 34 may use err($C_i$,0) calculated by the coefficient optimization unit 32 for determining the quantized coefficient corresponding to each orthogonal transform coefficient, for the calculation of CGDist0($m$). The correction value calculation unit 34 reads, from the memory unit 37, err($C_i$,0) of each quantized coefficient included in the target coefficient group sequentially from the coefficient group next to the coefficient group including the current final-coefficient candidate, and adds the read err($C_i$,0) to the correction value ΣCGDist0($t$) at the time point. As a result of this calculation, the correction value calculation unit 34 can calculate the correction value ΣCGDist0($t$) for the target coefficient group. The correction value calculation unit 34 passes the calculated correction value ΣCGDist0($t$) [t=m+1, . . . , m+s] to the final-coefficient-position determination unit 35. When the final-coefficient candidate for the entire TU is updated by use of the final-coefficient candidate of the target coefficient group, the correction value calculation unit 34 resets the correction value ΣCGDist0($t$) to zero.

The final-coefficient-position determination unit 35 determines, for each coefficient group sequentially from the lowest-frequency coefficient group, a final-coefficient candidate on the assumption that a final coefficient is included in the coefficient group. In other words, the final-coefficient-position determination unit 35 performs the above-described process (3) on each coefficient group sequentially from the lowest-frequency coefficient group. The final-coefficient-position determination unit 35 determines the final-coefficient candidate of the time point at the completion of the process for all the coefficient groups, to be the final coefficient and identifies the position of the final coefficient.

The final-coefficient-position determination unit 35 first determines the position of the final coefficient candidate in the target coefficient group. Then, the final-coefficient-position determination unit 35 compares the RD cost of the final-coefficient candidate of the entire TU obtained on the basis of the coefficient groups targeted previously with the RD cost of the final-coefficient candidate of the target coefficient group, by use of the correction value and Opt( ). When the RD cost of the target coefficient group is lower, the final-coefficient-position determination unit 35 determines the final-coefficient candidate of the target coefficient group to be the final-coefficient candidate of the entire TU.

First, description is given of determination of a final-coefficient candidate of a target coefficient group.

Figure 6:
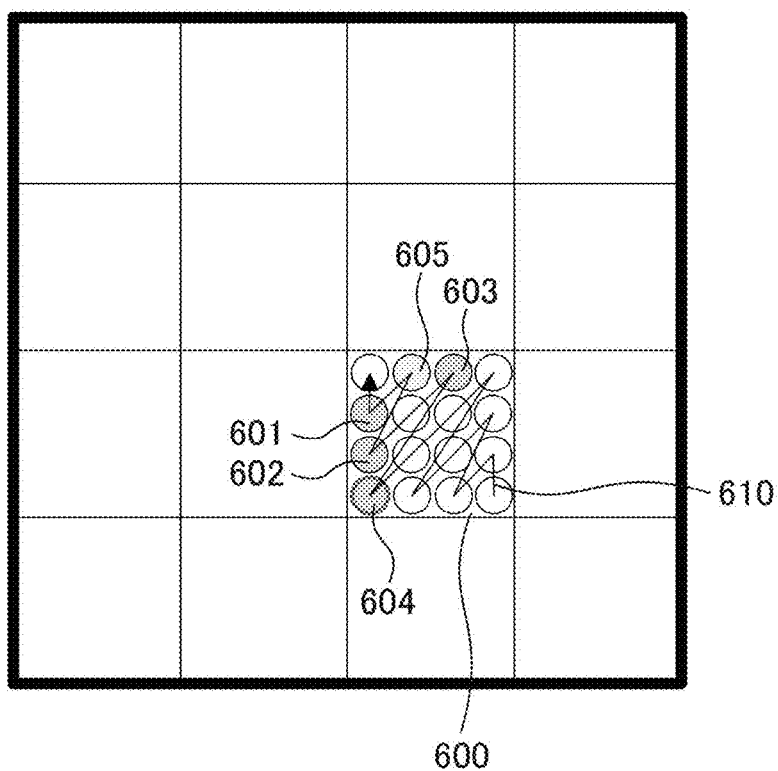
FIG. 6 is a diagram illustrating an example of an order in which scanning for a final-coefficient position is performed on a target coefficient group and final-coefficient candidates.

FIG. 6 is a diagram illustrating an example of an order in which scanning for a final-coefficient position is performed on a target coefficient group and final-coefficient candidates. Assume in FIG. 6 that quantized coefficients 601 to 604 among the quantized coefficients included in a target coefficient group 600 each have an absolute value of one, and a quantized coefficient 605 has an absolute value of two or larger. All the other quantized coefficients are assumed to be zero. Since scanning for a final-coefficient position is performed from the highest-frequency quantized coefficient as indicated by an arrow 610, the quantized coefficients 602 to 604, which are positioned on the higher-frequency side of the quantized coefficient 605 among the quantized coefficients 601 to 604, are determined as final-coefficient candidates.

The final-coefficient-position determination unit 35 calculates, for each quantized coefficient determined as a final-coefficient candidate, i.e., for each quantized coefficient followed by quantized coefficients each having an absolute value of one or smaller and has an amount of coding of a certain value or smaller, the RD cost TUCost(k) of the entire TU according to the following equations.

$$\text{TUCost}(k)=\Sigma_{i=0}^{i=k}\text{err}(C_i,l_i)+\Sigma_{i=k+1}^{i=n}\text{err}(C_i,0)+\lambda \text{CBits}(k)$$

$$\text{CBit}(k)=\Sigma_{i=0}^{i=k}\text{coeffN}\times\text{NCost}(i)+\Sigma_{m=0}^{m=k/16}\text{CGBits}(m)+\text{TUBits}(k)$$

$$\text{TUBits}(k)=cbf+\text{lastSigCoeffX}+\text{lastSigCoeffY} \tag{10}$$

Wherein, k denotes the number of the quantized coefficient serving as a candidate of target final-coefficient counted from the lowest-frequency quantized coefficient (where k=0 for the lowest-frequency coefficient). In addition, n denotes a value (TUSize$^2$-1) obtained by subtracting one from the total number of quantized coefficients included in the entire TU. Σerr($C_i$,$l_i$)[i=0, . . . k] expresses the coding errors of the zeroth to k-th quantized coefficients, and Σerr($C_i$,0) [i=k+1, . . . n] expresses the coding errors when the (k+1)-th to n-th quantized coefficients are set at zero. $C_i$ and $l_i$ are respectively the i-th orthogonal transform coefficient and the corresponding quantized coefficient. Note that err($C_i$,$l_i$) and err($C_i$,0) are calculated according to a similar calculation formula as that for err($C_i$,$l_i^{test}$) presented in equation (3).

CBits(k) denotes the amount of coding of the entire TU. In the equation for CBits(k), coeffN×NCost[i] is calculated according to the similar calculation formula as that for coeffN×NCost[i] presented in equation (4). The amount of coding of each quantized coefficient positioned on the higher-frequency side of the position k is set at zero. The final-coefficient-position determination unit 35 may use, for the calculation of CBits(k), the value of coeffN×NCost[i] calculated by the coefficient optimization unit 32 for determining quantized coefficients.

CGBits(m) denotes the amount of coding of the information indicating whether the coefficient group includes any quantized coefficient that is not zero, the amount of coding being calculated on the basis of the syntax elements of the coefficient group. CGBits(m) of each coefficient group on the lower-frequency side of the coefficient group including the final coefficient is calculated by the similar method as that for calculating CGBits(m) presented in equation (5). For each of the coefficient group including the final coefficient and the subsequent coefficient groups, CGBits(m) is zero.

TUBits(k) denotes the amount of coding of the syntax elements representing the final-coefficient position and corresponds to the bin number before the code of the syntax elements are calculated according to the CABAC by the variable-length coding unit 14. A syntax element cbf of the syntax elements indicates whether quantized coefficients are included in the entire TU, and the amount of coding of the syntax element is zero or one. Whether the amount of coding is to be zero or one is determined before the quantization unit 13 starts the process for the TU. The syntax elements lastSigCoeffX and lastSigCoeffY respectively denote the x-direction position and the y-direction position of the final-coefficient position (k in this example) in the entire TU, and the amounts of coding of the syntax elements correspond to the bin numbers of the respective syntax elements.

The final-coefficient-position determination unit 35 calculates the RD cost TUCost(k) for each final-coefficient candidate of the target coefficient group and determines the candidate having the smallest TUCost(k), as the final-coefficient candidate of the target coefficient group.

Next, the final-coefficient-position determination unit 35 compares the RD cost of the final-coefficient candidate of the entire TU obtained on the basis of the coefficient groups on the lower-frequency side of the target coefficient group with the RD cost of the final-coefficient candidate of the target coefficient group. When the RD cost of the final-coefficient candidate of the target coefficient group is smaller, the final-coefficient-position determination unit 35 updates the final-coefficient candidate of the entire TU by use of the final-coefficient candidate of the target coefficient group. In contrast, when the RD cost of the final-coefficient candidate of the entire TU is smaller, the final-coefficient-position determination unit 35 does not update the final-coefficient candidate of the entire TU.

The comparison between the RD cost of the final-coefficient candidate of the entire TU and the RD cost of the final-coefficient candidate of the target coefficient group corresponds to the comparison of the RD costs between the respective coefficient groups. Hence, the final-coefficient-position determination unit 35 calculates, for the final-coefficient candidate of the target coefficient group, the cost Opt(Int) obtained by subtracting the coding errors of the coefficient groups subsequent to the target coefficient group from the RD cost of the entire TU according to equation (8) and equation (9). Int denotes the number of the target coefficient group. The final-coefficient-position determination unit 35 compares the two RD costs according to equation (9) by use of the cost Opt(min) calculated for the final-coefficient candidate of the entire TU and stored in the memory unit 37 and the correction value ΣCGDist0 between (min+1) to Int received from the correction value calculation unit 34.

When the target coefficient group includes one or more quantized coefficients each having an absolute value of two or larger, the final-coefficient-position determination unit 35 discards the final-coefficient candidate of the entire TU determined on the basis of the coefficient groups targeted prior to the target coefficient group. This is because, according to the condition for a final coefficient, there is no possibility for any quantized coefficients positioned on the lower-frequency side of a quantized coefficient having an absolute value of two or larger to be the final coefficient.

The final-coefficient-position determination unit 35 stores the final-coefficient candidate of the entire TU excluding coefficient groups in each of which all the quantized coefficients are substituted by zero through the coefficient group optimization process, and the final-coefficient candidate of the entire TU independent of the result of the coefficient group optimization process in the memory unit 37. The reason of storing two final-coefficient candidates is that the result of coefficient group optimization process may be cancelled upon completion of determination of the final-coefficient position of the final coefficient group. Such cancellation is possible to happen due to the limitation that the coefficient group optimization process is not performed on the coefficient group including the final-coefficient position.

Description is given of an example of optimization of coefficient groups and update of a candidate for a final-coefficient position with reference to FIGS. 7 to 11. In FIGS. 7 to 11, it is assumed that a TU 700 includes four-by-four coefficient groups. In FIGS. 7 to 11, a circle 721 represents a coefficient group including a final-coefficient candidate of the entire TU excluding coefficient groups in each of which all the quantized coefficients are substituted by zero through the coefficient group optimization process. A square 722 represents a coefficient group including a final-coefficient candidate of the entire TU independent of a result of coefficient group optimization process. In FIGS. 7 to 11, a cost Opt( ) of the circle 721 is denoted by TUcost, and a corresponding correction value is denoted by DistD. A cost Opt( ) of the square 722 is denoted by TUCostCt, and a corresponding correction value is denoted by DistCtD.

A numeric value 0 or 1 presented in each coefficient group indicates whether the coefficient group includes any quantized coefficient that is not zero. The numeric value 0 indicates that the coefficient group does not include any quantized coefficient that is not zero, and the numeric value 1 indicates that the coefficient group includes one or more quantized coefficients that are not zero.

In FIGS. 7 to 11, the coefficient groups indicated in grey present groups not targeted for a coefficient group optimization quantized nor a determination process of a final-coefficient position.

Figure 7:
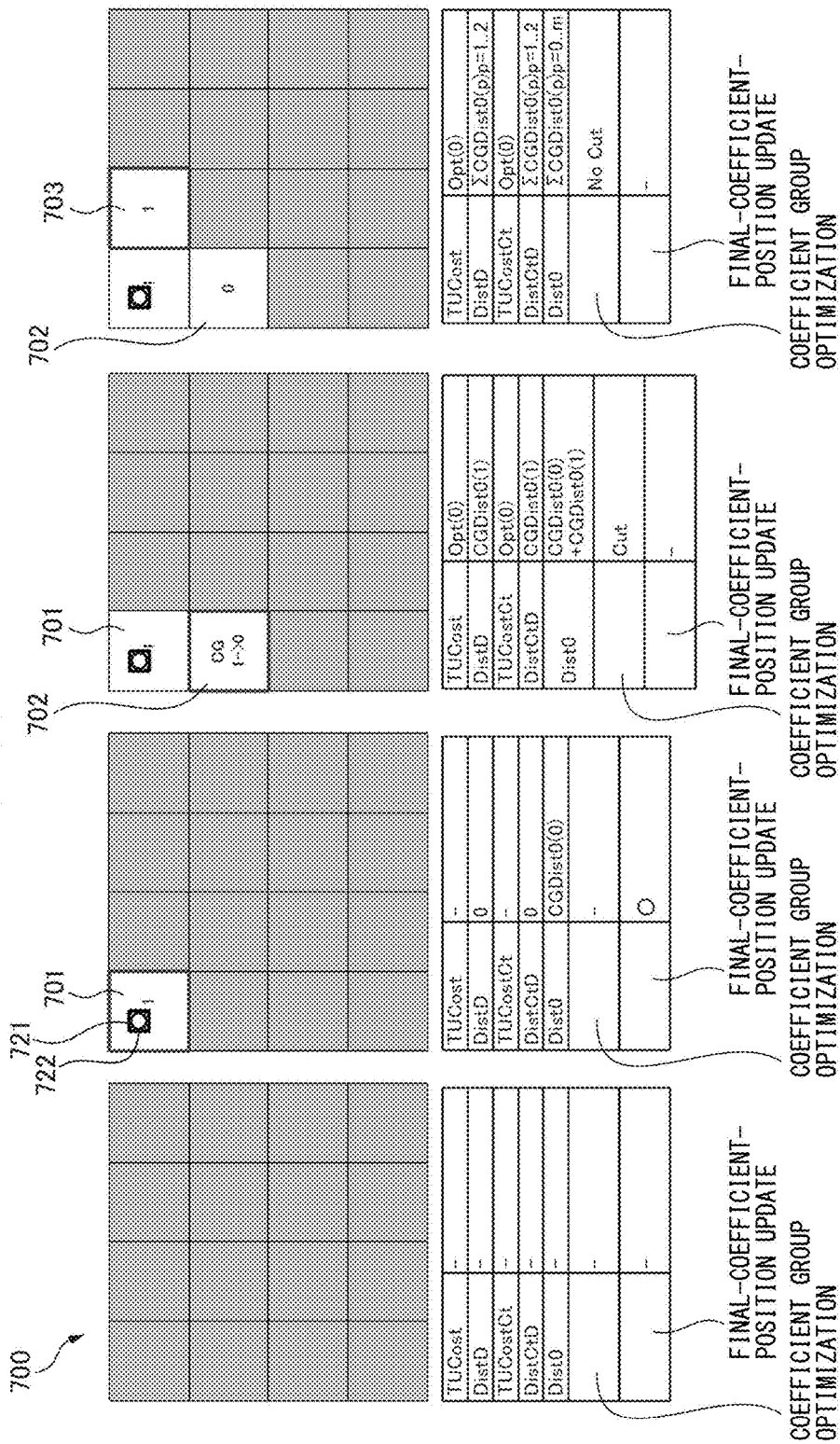
FIG. 7 is an explanatory diagram illustrating an example of optimization of coefficient groups and update of a final-coefficient-position candidate.

As illustrated in FIG. 7, first, the upper left end, i.e., a lowest-frequency coefficient group 701 including a direct-current component serves as a processing target. Since coefficient group optimization is not performed on any coefficient group including a direct-current component, only determination of a final-coefficient candidate of a coefficient group is performed for the coefficient group 701. As a result, Opt(0) is stored in TUCostCt and TUCost.

Next, a coefficient group 702 corresponding to the lowest frequency after that of the coefficient group 701 serves as a processing target. All the quantized coefficients of the coefficient group 702 are substituted by zero through the coefficient group optimization process. As for the final-coefficient position, the RD cost of the final-coefficient candidate of the coefficient group 701 is lower than the RD cost of the final-coefficient candidate of the coefficient group 702. Accordingly, the final-coefficient candidate as the entire TU is assumed to be included in the coefficient group 701, and hence the position of the final-coefficient candidate is not updated.

Next, a coefficient group 703 corresponding to the lowest frequency after that of the coefficient group 702 serves as a processing target. All the quantized coefficients included in the coefficient group 703 are maintained through the coefficient group optimization process. As for the final-coefficient position, the RD cost of the final-coefficient candidate of the coefficient group 701 is lower than the RD cost of the final-coefficient candidate of the coefficient group 703. Accordingly, the final-coefficient candidate of the entire TU is assumed to be included in the coefficient group 701, and hence the position of the final-coefficient candidate is not updated.

Figure 8:
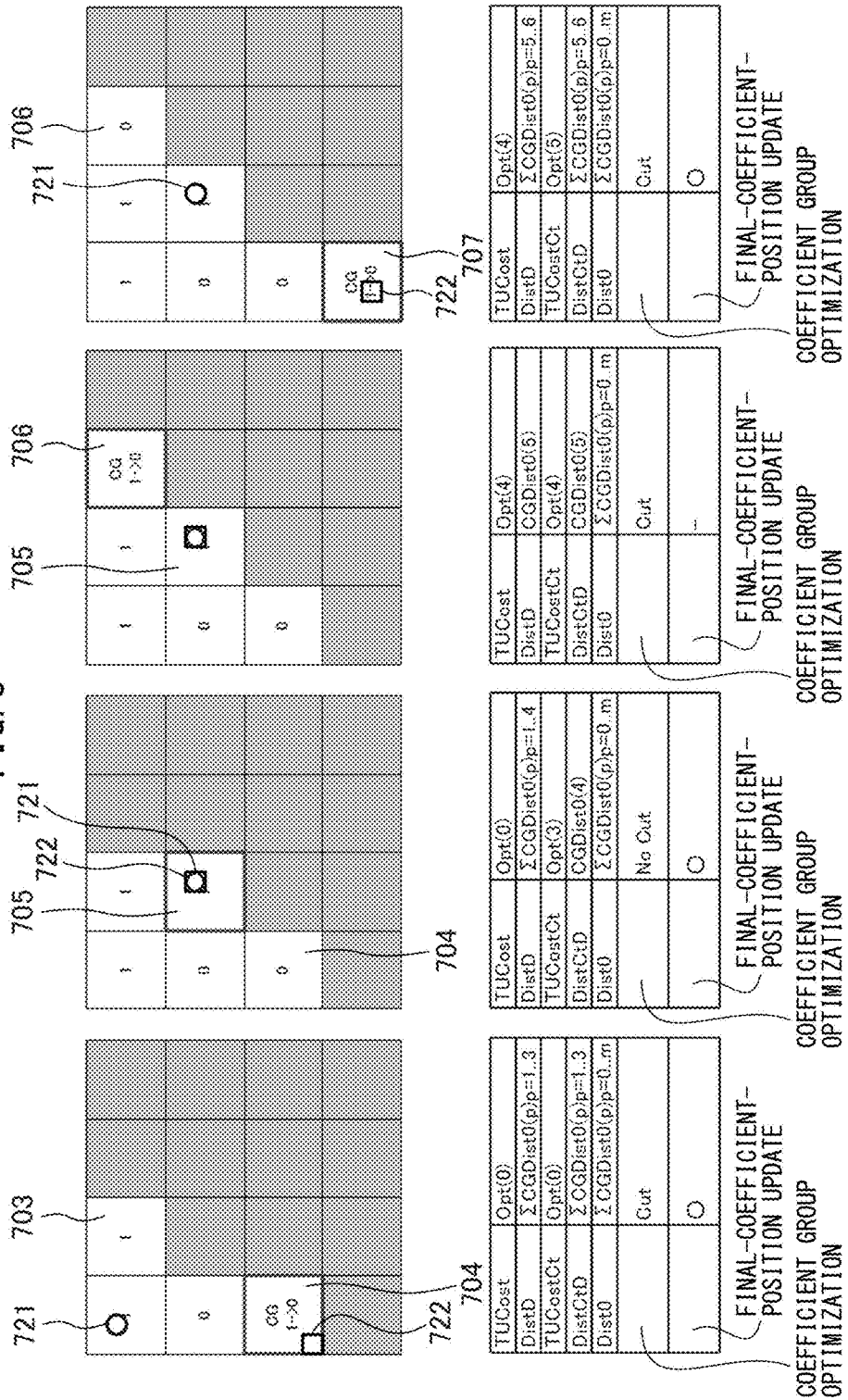
FIG. 8 is an explanatory diagram illustrating the example of optimization of coefficient groups and update of a final-coefficient-position candidate.

Next, as illustrated in FIG. 8, a coefficient group 704 corresponding to the lowest frequency after that of the coefficient group 703 serves as a processing target. All the quantized coefficients of the coefficient group 704 are substituted by zero through the coefficient group optimization process. The RD cost of the final-coefficient candidate of the coefficient group 704 is lower than the RD cost of the final-coefficient candidate of the coefficient group 701. Accordingly, as indicated by the square 722, the final-coefficient candidate of the entire TU independent of the result of the coefficient group optimization is assumed to be included in the coefficient group 704, and hence the position of the final-coefficient candidate is updated accordingly. In addition, TUCostCt is also updated to Opt(3). All the quantized coefficients of the coefficient group 704 are substituted by zero through the coefficient group optimization process. As a result, the candidate of the coefficient group 701 is maintained as the final-coefficient candidate of the entire TU dependent on the result of the coefficient group optimization as indicated by the circle 721.

Next, a coefficient group 705 corresponding to the lowest frequency after that of the coefficient group 704 serves as a processing target. All the quantized coefficients of the coefficient group 705 are maintained through the coefficient group optimization process. The RD cost of the final-coefficient candidate of the coefficient group 705 is lower than the RD cost of the final-coefficient candidate of the entire TU dependent on the result of the coefficient group optimization. Similarly, the RD cost of the final-coefficient candidate of the coefficient group 705 is lower than the RD cost of the final-coefficient candidate of the entire TU independent of the result of the coefficient group optimization. Accordingly, as indicated by the circle 721 and the square 722, the final-coefficient candidates of the entire TU both dependent on and independent of the result of the coefficient group optimization are updated to the final-coefficient of the coefficient group 705. Then, both TUCost and TUCostCt are updated to Opt(4).

Next, a coefficient group 706 corresponding to the lowest frequency after that of the coefficient group 705 serves as a processing target. All the quantized coefficients of the coefficient group 706 are substituted by zero through the coefficient group optimization process. As for the final-coefficient position, the RD cost of the final-coefficient candidate of the coefficient group 705 is lower than the RD cost of the final-coefficient candidate of the coefficient group 706. Accordingly, the final-coefficient candidate of the entire TU is assumed to be included in the coefficient group 705, and hence the position of the final-coefficient candidate is not updated.

Next, a coefficient group 707 corresponding to the lowest frequency after that of the coefficient group 706 serves as a processing target. All the quantized coefficients of the coefficient group 707 are substituted by zero through the coefficient group optimization process. The RD cost of the final-coefficient candidate of the coefficient group 707 is lower than the RD cost of the final-coefficient candidate of the coefficient group 705. Accordingly, the final-coefficient candidate of the entire TU independent of the result of the coefficient group optimization is assumed to be included in the coefficient group 707 as indicated by the square 722, and hence the position of the final-coefficient candidate is updated accordingly. In addition, TUCostCt is updated to Opt(6). Meanwhile, the candidate of the coefficient group 705 is maintained as the final-coefficient candidate of the entire TU dependent on the result of the coefficient group optimization.

Figure 9:
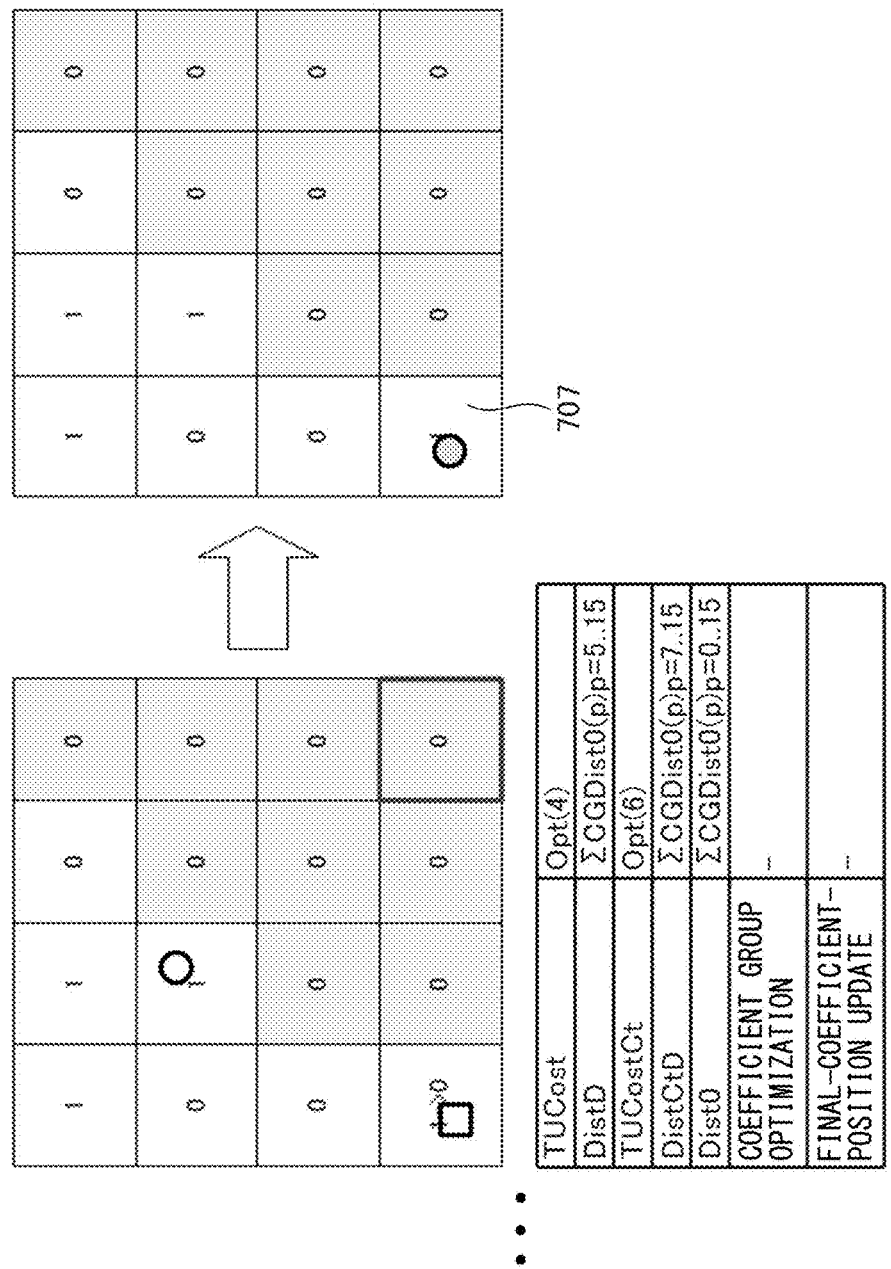
FIG. 9 is an explanatory diagram illustrating the example of optimization of coefficient groups and update of a final-coefficient-position candidate.

Assume, as illustrated in FIG. 9, that the coefficient groups subsequent to the coefficient group 707 do not include any quantized coefficient that is not zero. In this case, the coefficient group optimization process is not performed on the coefficient group 707. Accordingly, substitution of the quantized coefficients included in the coefficient group 707 by zero is cancelled. For the cancellation, the determination unit 36 reads the original quantized coefficients of the coefficient group 707 stored in the memory unit 37, and restores the substituted quantized coefficients of the coefficient group 707 to the original quantized coefficients.

In this case, the final-coefficient-position determination unit 35 determines the final-coefficient candidate of the entire TU independent of the result of the coefficient group optimization, i.e., the final-coefficient candidate included in the coefficient group 707, as the final coefficient. Then, the final-coefficient-position determination unit 35 sets TUCostCt at the cost corresponding to the final coefficient. In this case, the RD cost of the entire TU corresponding to the final coefficient is TUCostCt+DistCtD.

Figure 10:
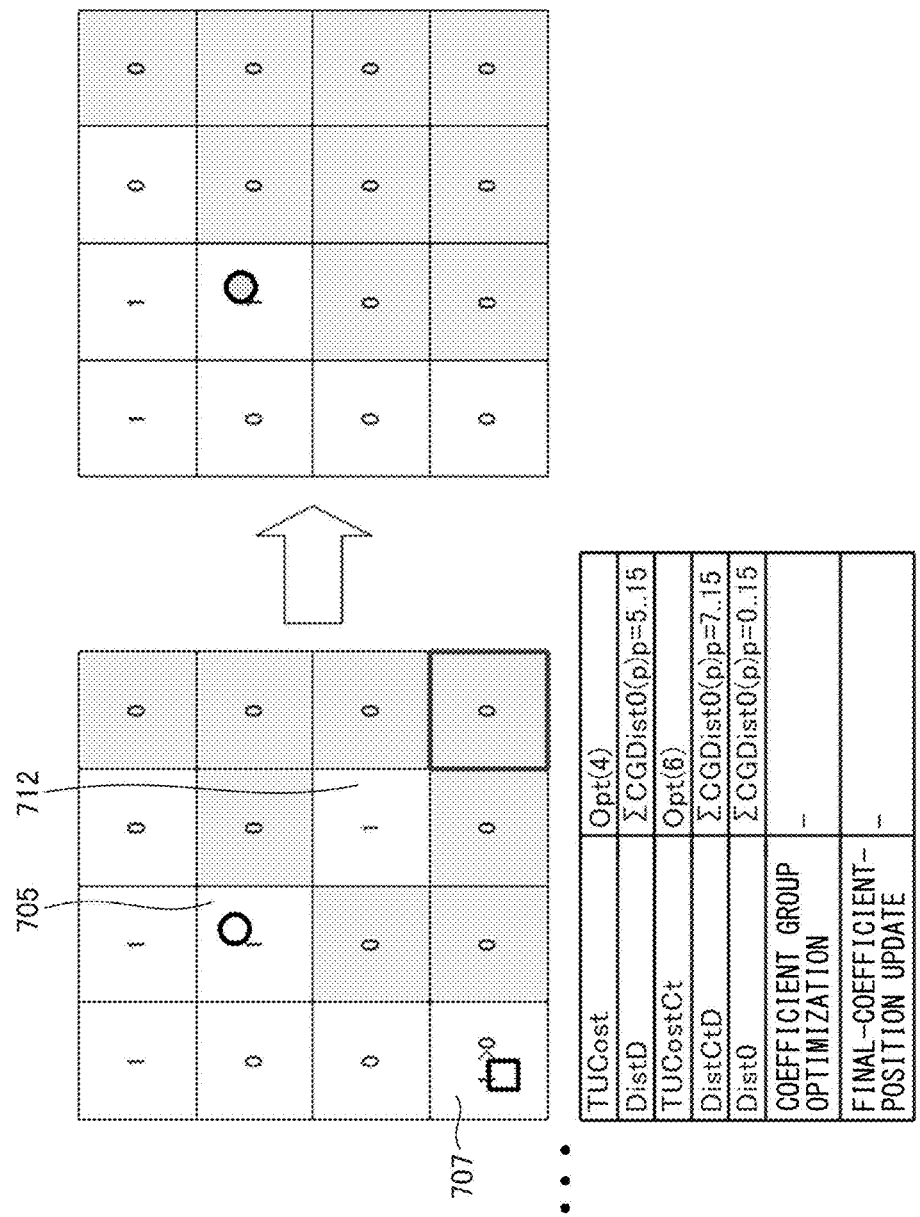
FIG. 10 is an explanatory diagram illustrating the example of optimization of coefficient groups and update of a final-coefficient-position candidate.

Assume, as illustrated in FIG. 10, that a coefficient group 712 includes one or more quantized coefficients each having an absolute value of one but does not include any quantized coefficient having an absolute value of two or larger. In addition, no coefficient group including any quantized coefficient that is not zero is assumed to exist subsequent to the coefficient group 712. In this case, when the RD cost of the final-coefficient candidate of the coefficient group 705 is lower than the RD cost of the final-coefficient candidate of the coefficient group 712, the final-coefficient-position determination unit 35 determines the final-coefficient candidate of the coefficient group 705 to be the final coefficient. In this case, the substitution of the quantized coefficients included in the coefficient group 707 by zero are maintained. Then, the final-coefficient-position determination unit 35 sets TUCost at the cost corresponding to the final coefficient. In this case, the RD cost of the entire TU corresponding to the final coefficient is TUCost+DistD.

Figure 11:
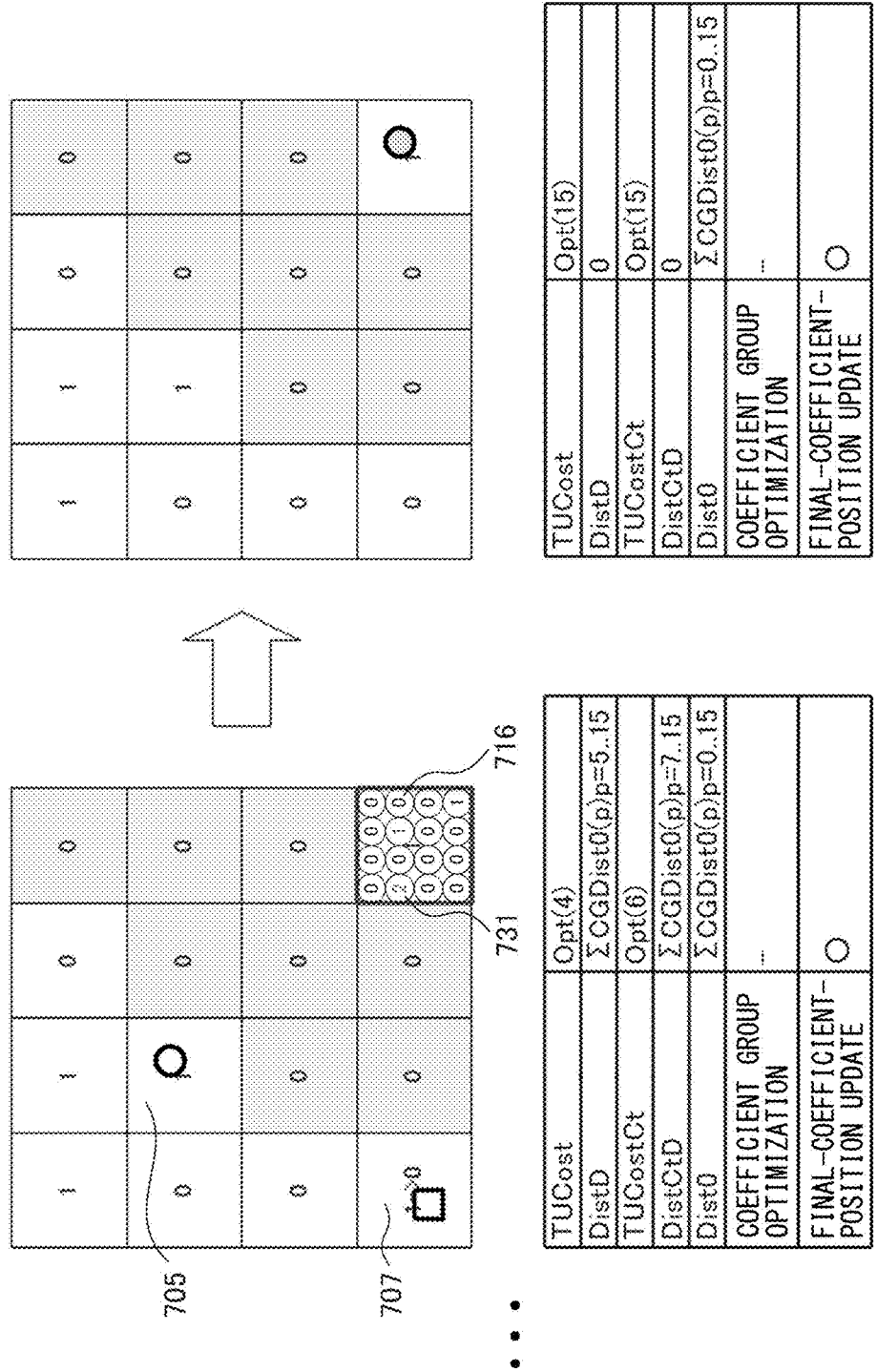
FIG. 11 is an explanatory diagram illustrating the example of optimization of coefficient groups and update of a final-coefficient-position candidates.

Assume, as illustrated in FIG. 11, that a quantized coefficient 731, which has an absolute value of two or larger, is included in the highest-frequency coefficient group 716. In this case, the final coefficient corresponds to a quantized coefficient subsequent to the quantized coefficient 731. Accordingly, the final-coefficient candidates of the coefficient group 705 and the coefficient group 707 are excluded from the final-coefficient candidates. As a result, the final-coefficient-position determination unit 35 determines the final-coefficient candidate of the coefficient group 716 to be the final coefficient. Also in this case, the substitution of the quantized coefficients included in the coefficient group 707 by zero are maintained.

The final-coefficient-position determination unit 35 notifies the determination unit 36 of the final-coefficient position and the RD cost of the entire TU corresponding to the final-coefficient position.

The determination unit 36 compares the RD cost of the entire TU corresponding to the final-coefficient position obtained by the final-coefficient-position determination unit 35 and the RD cost Jz in the case of substituting all the quantized coefficients included in the TU by zero. When the RD cost of the entire TU corresponding to the final-coefficient position is smaller than or equal to the RD cost Jz, the determination unit 36 outputs the quantized coefficients of the TU, information indicating, for each coefficient group, whether the coefficient group includes any coefficient that is not zero, and information indicating the final-coefficient position, to the variable-length coding unit 14 and the decoding unit 15. When all the quantized coefficients included in the coefficient group including the final coefficient are substituted by zero through the coefficient group optimization process, the determination unit 36 reads the values of the respective quantized coefficients included in the coefficient group, from the memory unit 37, and restores the quantized coefficients to the original values.

In contrast, when the RD cost Jz is smaller, the determination unit 36 substitutes all the quantized coefficients included in the TU by zero. Then, the determination unit 36 outputs information indicating that the TU includes no quantized coefficient that is not zero, to the variable-length coding unit 14 and the decoding unit 15.

The determination unit 36 calculates the RD cost Jz according to the following equation.

$$Jz = \Sigma_{tu} \text{err}(C_i, 0) + \lambda \cdot \text{CBits} \qquad (11)$$

Wherein, $\Sigma_{tu}\text{err}(C_i,0)$ expresses the coding error of the entire TU when all the quantized coefficients are substituted by zero. The determination unit 36 can obtain the sum of $\text{err}(C_i,0)$ calculated in quantized coefficient optimization, as $\Sigma_{tu}\text{err}(C_i,0)$. CBits denotes the amount of coding of the entire TU in the case of substituting all the quantized coefficients by zero. When the size of the TU is equal to the size of the CU including the TU, CBits=0; when the size of the TU is different from the size of the CU including the TU, CBits=1.

Figure 12A:
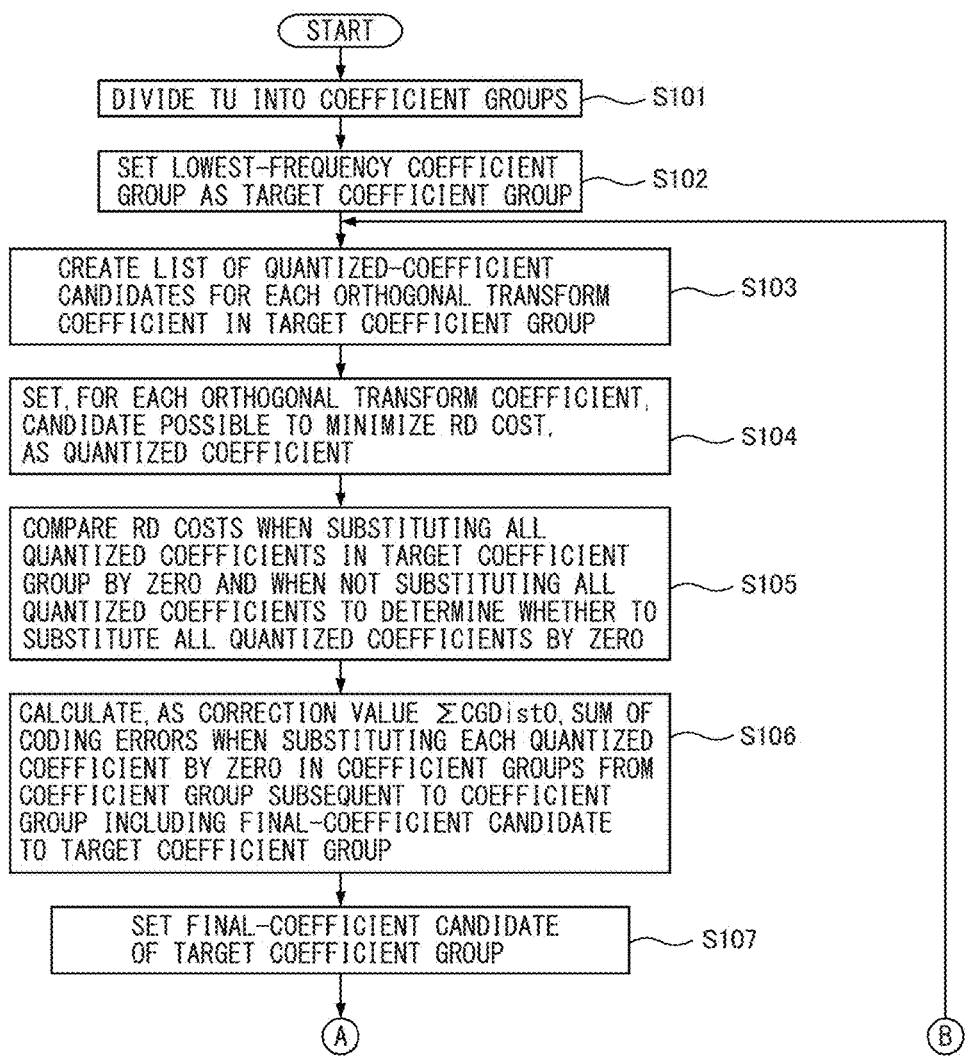
FIGS. 12A and 12B are an operational flowchart of a rate distortion optimized quantization process.
Figure 12B:
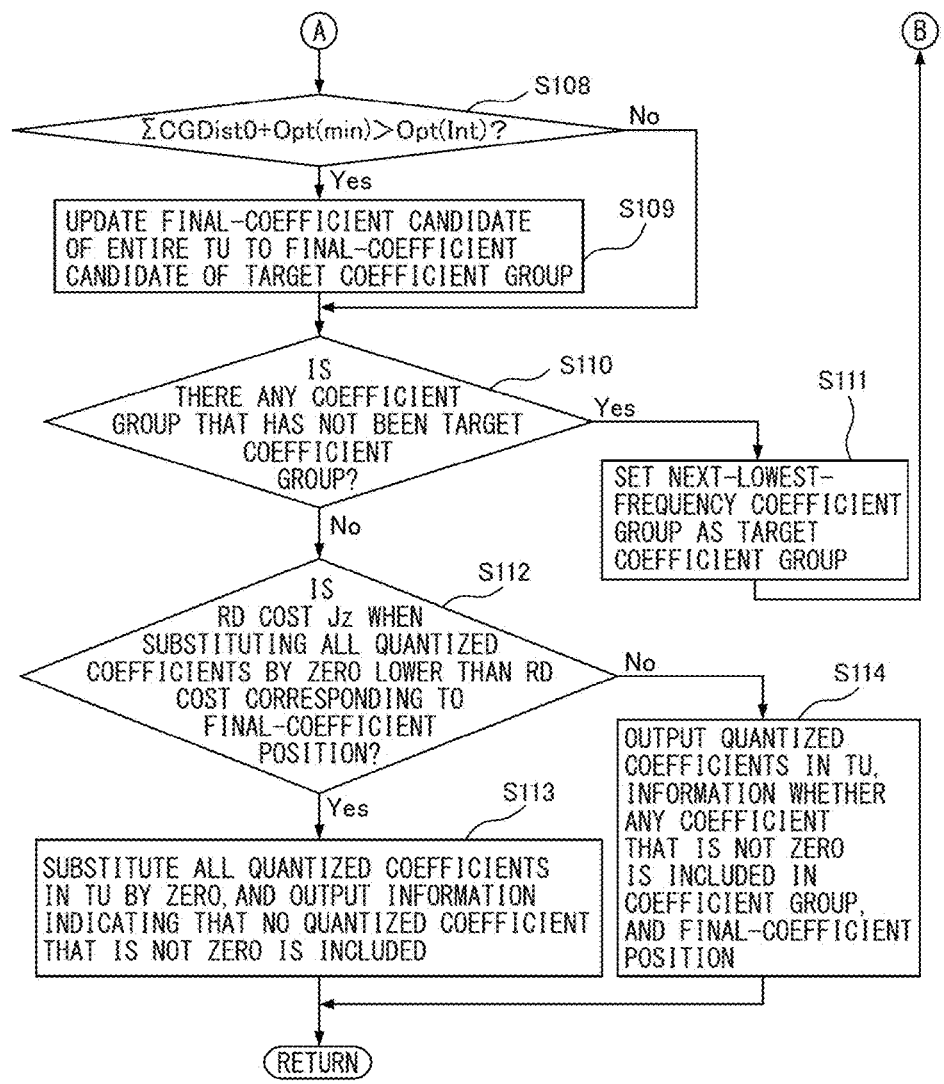

FIGS. 12A and 12B are an operational flowchart of a rate distortion optimized quantization process performed by the quantization unit 13. The quantization unit 13 performs the rate distortion optimized quantization process on each block serving as a unit in orthogonal transform (each TU, in this example), according to the operational flowchart to be described below.

The control unit 30 divides a TU into coefficient groups (Step S101). The control unit 30 sets the lowest-frequency coefficient group among the obtained coefficient groups, as a target coefficient group (Step S102). The control unit 30 inputs the target coefficient group to the scaling unit 31.

The scaling unit 31 creates, for each orthogonal transform coefficient included in the target coefficient group, a list of quantized-coefficient candidates {0, coeff-1, coeff} corresponding to the orthogonal transform coefficient according to a quantization parameter (Step S103). The scaling unit 31 passes the list of quantized-coefficient candidates of each orthogonal transform coefficient included in the target coefficient group, to the coefficient optimization unit 32.

The coefficient optimization unit 32 identifies, for each orthogonal transform coefficient included in the target coefficient group, the candidate having the smallest RD cost among the quantized-coefficient candidates included in the candidate list, and sets the identified candidate as the quantized coefficient corresponding to the orthogonal transform coefficient (Step S104). Then, the coefficient optimization unit 32 stores the quantized coefficients included in the target coefficient group, in the memory unit 37, and notifies the coefficient group optimization unit 33 and the final-coefficient-position determination unit 35 of the quantized coefficients. In addition to the above, the coefficient optimization unit 32 also stores the coding error $\text{err}(C_i,0)$ of the quantized-coefficient candidate '0' obtained for calculating the RD cost of each orthogonal transform coefficient, in the memory unit 37.

The coefficient group optimization unit 33 compares, for the target coefficient group, the RD cost in the case of substituting all the quantized coefficients by zero and the RD cost in the case of maintaining all the quantized coefficients, and determines whether to substitute all the quantized coefficients by zero (Step S105). The coefficient group optimization unit 33 stores the determination result in the memory unit 37 and notifies the final-coefficient-position determination unit 35 of the determination result.

The correction value calculation unit 34 calculates, as the correction value $\Sigma \text{CGDist0}$, the sum of the coding errors in the case of substituting, by zero, the quantized coefficients included in the coefficient groups from the coefficient group subsequent to the coefficient group including the current final-coefficient candidate to the target coefficient group (Step S106). Then, the correction value calculation unit 34 passes the correction value $\Sigma \text{CGDist0}$ to the final-coefficient-position determination unit 35.

The final-coefficient-position determination unit 35 calculates the RD cost of each of a quantized coefficient that has an absolute value of two or larger and quantized coefficients each of which has an absolute value of one and is positioned on the higher-frequency side of the quantized coefficient having an absolute value of two or larger in the target coefficient group, assuming that all the quantized coefficients on the higher-frequency side of the quantized coefficient are substituted by zero. Then, the final-coefficient-position determination unit 35 sets the quantized coefficient having the smallest RD cost as the final-coefficient candidate of the target coefficient group (Step S107).

As illustrated in FIG. 12B, the final-coefficient-position determination unit 35 further determines whether the RD cost of the final-coefficient candidate of the target coefficient group is lower than the RD cost of the current final-coefficient candidate of the entire TU. In this embodiment, the final-coefficient-position determination unit 35 determines whether the cost Opt(Int) of the target coefficient group is lower than the value obtained by adding the correction value $\Sigma \text{CGDist0}$ to the cost Opt(min) of the current coefficient group including the final-coefficient candidate of the entire TU (Step S108). When Opt(Int) is lower than (Opt(min)+$\Sigma \text{CGDist0}$) (Yes in Step S108), the final-coefficient-position determination unit 35 updates the final-coefficient candidate of the entire TU to the final-coefficient candidate of the target coefficient group (Step S109).

After Step S109, the control unit 30 determines whether there is any coefficient group that has not been a target coefficient group (Step S110). Note that the control unit 30 performs the operation in Step S110 also when the RD cost of the current final-coefficient candidate of the entire TU is lower than or equal to the RD cost of the final-coefficient candidate of the target coefficient group (No in Step S108).

When there are still one or more coefficient groups each of which has not been a target coefficient group (Yes in Step S110), the control unit 30 sets the lowest-frequency coefficient group among the coefficient groups each of which has not been a target coefficient group, as a target coefficient group (Step S111). Then, the control unit 30 inputs the target coefficient group to the scaling unit 31, and the quantization unit 13 performs the operations in Step S103 and the subsequent steps.

When there is no more coefficient group that has not been a target coefficient group (No in Step S110), the control unit 30 instructs the final-coefficient-position determination unit 35 to determine the current final-coefficient candidate of the entire TU to be the final coefficient, and to notify the determination unit 36 of the final-coefficient position and the corresponding RD cost.

The determination unit 36 determines whether the RD cost Jz of the entire TU in the case of substituting all the quantized coefficients included in the TU by zero is lower than the RD cost of the entire TU corresponding to the final-coefficient position (Step S112). When the RD cost Jz is lower than the RD cost of the entire TU corresponding to the final-coefficient position (Yes in Step S112), the determination unit 36 substitutes all the quantized coefficients included in the TU by zero (Step S113). Then, the determination unit 36 notifies the variable-length coding unit 14 and the decoding unit 15 of the information indicating that the TU includes no quantized coefficient that is not zero.

In contrast, when the RD cost Jz is higher than or equal to the RD cost of the entire TU corresponding to the final-coefficient position (Yes in Step S112), the determination unit 36 maintains the quantized coefficients in the TU. Then, the determination unit 36 outputs the quantized coefficients in the TU, information indicating, for each coefficient group, whether the coefficient group includes any coefficient that is not zero, and information indicating the final-coefficient position, to the decoding unit 15 and the variable-length coding unit 14 (Step S114). After Step S113 or S114, the quantization unit 13 terminates the rate distortion optimized quantization process.

Figure 13:
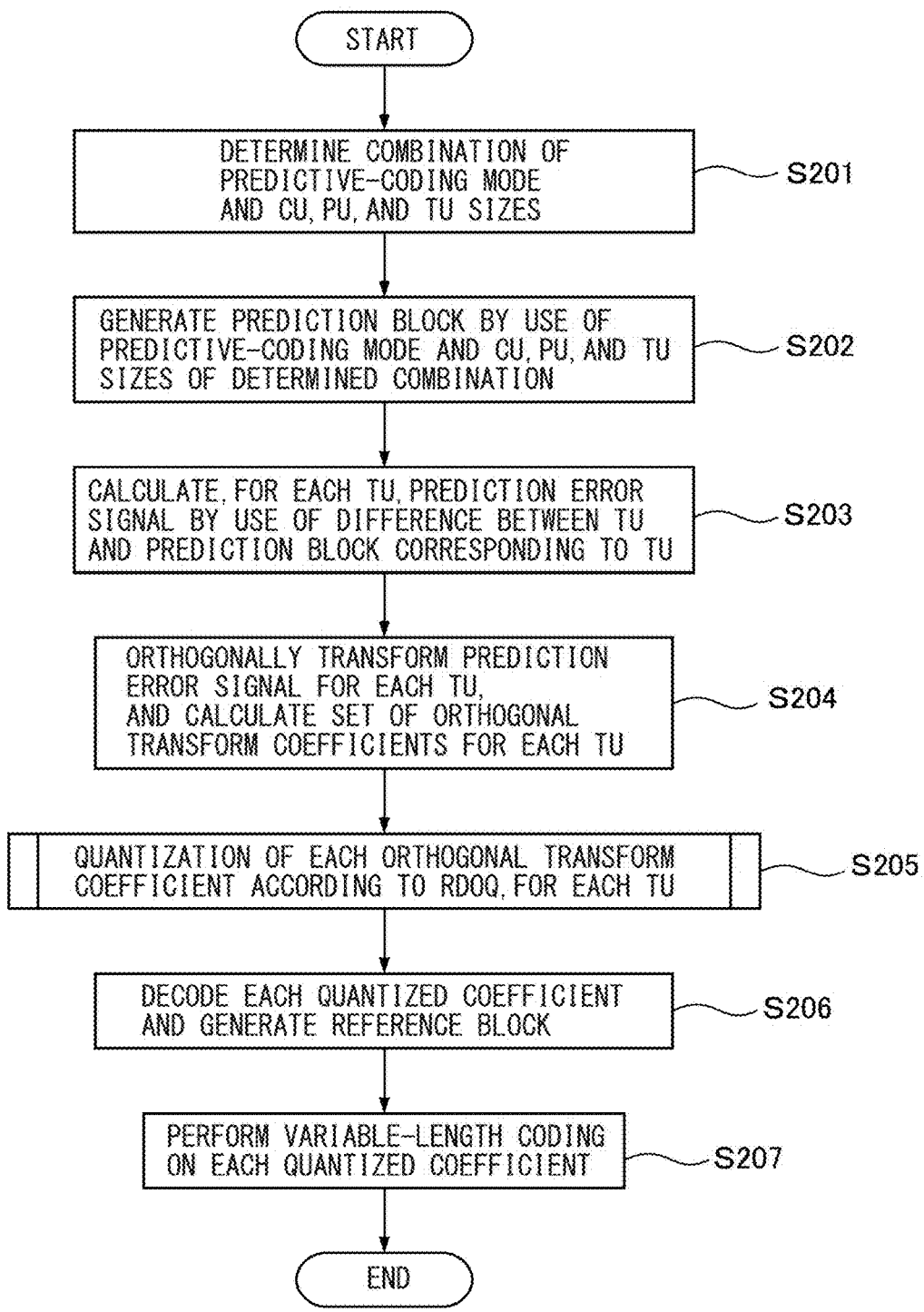
FIG. 13 is an operational flowchart of a video encoding process.

FIG. 13 is an operational flowchart of a video encoding process performed by the video encoding apparatus 1 according to one embodiment. The video encoding apparatus 1 performs the video encoding process on each CTU included in a coding-target picture.

The encoding mode determination unit 21 determines the combination possible to minimize the coding cost among the combinations of a predictive coding mode, a CU size, a PU size, and a TU size (Step S201). The prediction block generation unit 22 calculates a prediction block of each TU included in the CTU according to the predictive coding mode, the CU size, the PU size, and the TU size in the determined combination (Step S202). The prediction-error-signal calculation unit 11 calculates, for each TU, the difference between each pixel of the TU and the pixel of the prediction block corresponding to the TU, and calculates a prediction error signal (Step S203).

After the calculation, the orthogonal transform unit 12 orthogonally transforms the prediction error signal for each TU and thereby calculates a set of orthogonal transform coefficients (Step S204). The quantization unit 13 performs the rate distortion optimization process on each orthogonal transform coefficient of each TU, and thereby quantizes each orthogonal transform coefficient (Step S205).

The decoding unit 15 generates a reference block by adding, to the prediction block, the prediction error signals regenerated through inverse quantization and inverse orthogonal transform being performed on the quantized coefficients (Step S206). Then, the decoding unit 15 stores the reference block in the memory unit 19. The variable-length coding unit 14 performs variable-length coding on the quantized coefficients (Step S207). The video encoding apparatus 1 then terminates the video encoding process.

As described above, the video encoding apparatus performs, for each block corresponding to a unit in orthogonal transform, the rate distortion optimization process on each orthogonal transform coefficient included in the block and thereby quantizes each orthogonal transform coefficient included in the block. In this process, the video encoding apparatus performs the coefficient group optimization process on each target coefficient group on the assumption that one or more quantized coefficients that are not zero are included in the coefficient groups positioned on the higher-frequency side of the target coefficient group. On the other hand, the video encoding apparatus determines a final-coefficient candidate on the assumption that no quantized coefficient that is not zero is included in any coefficient group positioned on the higher-frequency side of the target coefficient group. The video encoding apparatus is configured to ignore the coding errors related to the coefficient groups positioned on the higher-frequency side of the target coefficient group in the comparison between the RD costs of the final-coefficient candidate of the target coefficient group and the final-coefficient candidate of the groups positioned on the lower-frequency side of that of the target coefficient group. This configuration enables the video encoding apparatus to perform a one-pass rate distortion optimization process on each coefficient groups sequentially from the lowest-frequency coefficient group, consequently increasing the throughput of the rate distortion optimization process.

In a modified example, the quantization unit 13 may not take into account a case of substituting all the quantized coefficients of the entire TU by zero. In this case, the quantization unit 13 determines the final-coefficient candidate having the smallest RD cost at the time when the determination of the final-coefficient position is completed for all the coefficient groups, as the final coefficient. In such a case, the determination unit 36 is omitted.

In another modified example, the encoding mode determination unit 21 may perform the similar process as that performed by the quantization unit 13, at the time of determining the predictive coding mode, the CU size, the PU size, and the TU size to be used for a coding target CTU. This enables the encoding mode determination unit 21 to determine a predictive coding mode, a CU size, a PU size, and a TU size that are appropriate in consideration of coding errors as well as amounts of coding.

A computer program capable of executing the functions of the units of the video encoding apparatus according to any one of the above-described embodiment and modified examples on a processor may be provided by being stored in a computer-readable medium.

The video encoding apparatus according to any one of the above-described embodiment and modified examples is used for various purposes. For example, the video encoding apparatus may be incorporated into a device such as a video camera, a video transmission device, a visual-telephone system, a computer, or a mobile phone.

FIG. 14 is a diagram illustrating a configuration of a computer capable of operating as a video encoding apparatus when a computer program for implementing the functions of units of the video encoding apparatus according to any one of the above-described embodiment and modified examples operates. A computer 100 includes a user interface unit 101, a communication interface unit 102, a memory unit 103, a storage medium access apparatus 104, and a processor 105. The processor 105 are connected to the user interface unit 101, the communication interface unit 102, the memory unit 103, and the storage medium access apparatus 104 via a bus, for example.

The user interface unit 101 includes, for example, input devices such as a keyboard and a mouse, and a display device such as a liquid crystal display. Alternatively, the user interface unit 101 may include a device in which an input device and a display device are integrated, such as a touch panel display. The user interface unit 101 outputs an operation signal for starting the video encoding process, to the processor 105 according to a user operation.

The communication interface unit 102 may include a communication interface for connecting the computer 100 to a video input device (not illustrated), such as a video camera, and a control circuit for the communication interface. Examples of the communication interface may be a high-definition multimedia interface and a universal serial bus (USB).

The communication interface unit 102 may include a communication interface for connecting the computer 100 to a communication network in accordance with a communication standard, such as Ethernet (registered trademark), and a control circuit for the communication interface. In this case, the communication interface unit 102 acquires video data in a specific video format from an image input device or a different device connected to the communication network, and passes the video data to the processor 105. The communication interface unit 102 may output encoded video data received from the processor 105, to a different device via the communication network.

The memory unit 103 includes a random access semiconductor memory and a read only semiconductor memory, for example. The memory unit 103 stores a computer program for performing the video encoding process to be executed on the processor 105, coding-target video data, and video data encoded by the processor 105.

The storage medium access apparatus 104 accesses the storage medium 106, which is, for example, a magnetic disk, a semiconductor memory card, or an optical storage medium. The storage medium access apparatus 104 reads, for example, a computer program for the video encoding process to be executed on the processor 105 from the storage medium 106 storing the computer program, and passes the computer program to the processor 105. The storage medium access apparatus 104 may write video data encoded by the processor 105, to the storage medium 106.

The processor 105 encodes video data by executing a computer program for the video encoding process according to any one of the above-described embodiment and modified examples. The processor 105 stores encoded video data in the memory unit 103 or outputs the encoded video data to a different device via the communication interface unit 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A video encoding apparatus comprising:
   a processor configured to:
   divide a plurality of orthogonal transform coefficients included in each of a plurality of blocks into a plurality of coefficient groups each of which includes a predetermined number of the orthogonal transform coefficients, the plurality of blocks being obtained by dividing a picture included in a video, the plurality of orthogonal transform coefficients being obtained by orthogonally transforming, for each block, a prediction error signal obtained on the basis of difference between a value of each pixel of the picture and a prediction signal of the pixel;
   determine, for each of the predetermined number of orthogonal transform coefficients included in a target coefficient group from among the plurality of coefficient groups, a candidate possible to minimize a cost obtained on the basis of a coding error and an amount of coding among a plurality of quantized-coefficient candidates to be used for quantizing the orthogonal transform coefficient, to be a quantized coefficient of the orthogonal transform coefficient, the target coefficient group being selected from among the plurality of coefficient groups sequentially from the coefficient group including the orthogonal transform coefficients corresponding to lowest frequencies;
   determine, for a target coefficient group, whether to substitute all the predetermined number of quantized coefficients included in the target coefficient group by zero, on the assumption that a quantized coefficient that is not zero is included in the coefficient group corresponding to higher frequencies than those of the target coefficient group, the target coefficient group being selected from among the plurality of coefficient groups sequentially from the coefficient group including the orthogonal transform coefficients corresponding to the lowest frequencies;
   determine, for a target coefficient group, a first candidate for the quantized coefficient corresponding to a highest frequency among the quantized coefficients that are included in the target coefficient group and are not zero, on the assumption that all the quantized coefficients included in the coefficient groups corresponding to higher frequencies than those of the target coefficient group are zero, the target coefficient group being selected from among the plurality of coefficient groups sequentially from the coefficient group including the orthogonal transform coefficients corresponding to the lowest frequencies;
   calculate the coding error of the coefficient groups from the coefficient group adjacent to the coefficient group including a second candidate for the quantized coefficient on a higher frequency side to the coefficient group including the first candidate, the second candidate being the quantized coefficient with the highest frequency among the quantized coefficients not being zero, obtained from the coefficient group corresponding to lower frequencies than those of the coefficient group including the first candidate;
   update the second candidate to the first candidate when a comparison cost obtained by subtracting the coding error of the coefficient group corresponding to higher frequencies than those of the coefficient group including the first candidate from the cost obtained for the first candidate is lower than a value obtained by adding the coding error to the comparison cost calculated for the second candidate, and determine the second candidate at time when the second candidate for the coefficient group corresponding to highest frequencies among the plurality of coefficient groups is updated, to be the quantized coefficient that is not zero and corresponds to a highest frequency; and
   calculate the coding error of the coefficient groups from the coefficient group adjacent to the coefficient group including the second candidate on a higher frequency side to the coefficient group including the first candidate,
   wherein
   the second candidate includes a third candidate and a fourth candidate, the third candidate being updated to the first candidate also when all the predetermined number of quantized coefficients included in the coefficient group including the first candidate are substituted by zero, the fourth candidate being not updated to the first candidate when all the predetermined number of quantized coefficients included in the coefficient group including the first candidate are substituted by zero, and
   the determining a quantized coefficient that is not zero and corresponds to a highest frequency determines the third candidate as the quantized coefficient that is not zero and corresponds to the highest frequency when all the quantized coefficients included in the coefficient groups corresponding to higher frequencies than those of the coefficient group including the third candidate are zero, and determines the fourth candidate as the quantized coefficient that is not zero and corresponds to the highest frequency when the quantized coefficient that is not zero is included in any one of the coefficient groups corresponding to higher frequencies than those of the coefficient group including the third candidate.

2. The video encoding apparatus according to claim 1, wherein, the calculating the coding error calculates the coding error on the assumption that all the quantized coefficients included in the coefficient groups from the coefficient group adjacent to the coefficient group including the second candidate on a higher frequency side to the coefficient group including the first candidate are zero.

3. A video encoding method comprising:

dividing, by a processor, a plurality of orthogonal transform coefficients included in each of a plurality of blocks into a plurality of coefficient groups each of which includes a predetermined number of the orthogonal transform coefficients, the plurality of blocks being obtained by dividing a picture included in a video, the plurality of orthogonal transform coefficients being obtained by orthogonally transforming, for each block, a prediction error signal obtained on the basis of difference between a value of each pixel of the picture and a prediction signal of the pixel;

determining, by the processor, for each of the predetermined number of orthogonal transform coefficients included in a target coefficient group from among the plurality of coefficient groups, a candidate possible to minimize a cost obtained on the basis of a coding error and an amount of coding among a plurality of quantized-coefficient candidates to be used for quantizing the orthogonal transform coefficient, to be a quantized coefficient of the orthogonal transform coefficient, the target coefficient group being selected from among the plurality of coefficient groups sequentially from the coefficient group including the orthogonal transform coefficients corresponding to lowest frequencies;

determining, by the processor, for a target coefficient group, whether to substitute all the predetermined number of quantized coefficients included in the target coefficient group by zero, on the assumption that a quantized coefficient that is not zero is included in the coefficient group corresponding to higher frequencies than those of the target coefficient group, the target coefficient group being selected from among the plurality of coefficient groups sequentially from the coefficient group including the orthogonal transform coefficients corresponding to the lowest frequencies;

determining, by the processor, for a target coefficient group, a first candidate for the quantized coefficient corresponding to a highest frequency among the quantized coefficients that are included in the target coefficient group and are not zero, on the assumption that all the quantized coefficients included in the coefficient groups corresponding to higher frequencies than those of the target coefficient group are zero, the target coefficient group being selected from among the plurality of coefficient groups sequentially from the coefficient group including the orthogonal transform coefficients corresponding to the lowest frequencies;

calculating, by the processor, the coding error of the coefficient groups from the coefficient group adjacent to the coefficient group including a second candidate for the quantized coefficient on a higher frequency side to the coefficient group including the first candidate, the second candidate being the quantized coefficient with the highest frequency among the quantized coefficients not being zero, obtained from the coefficient group corresponding to lower frequencies than those of the coefficient group including the first candidate;

updating, by the processor, the second candidate to the first candidate when a comparison cost obtained by subtracting the coding error of the coefficient group corresponding to higher frequencies than those of the coefficient group including the first candidate from the cost obtained for the first candidate is lower than a value obtained by adding the coding error to the comparison cost calculated for the second candidate, and determining the second candidate at time when the second candidate for the coefficient group corresponding to highest frequencies among the plurality of coefficient groups is updated, to be the quantized coefficient that is not zero and corresponds to a highest frequency; and calculating, by the processor, the coding error of the coefficient groups from the coefficient group adjacent to the coefficient group including the second candidate on a higher frequency side to the coefficient group including the first candidate, wherein the second candidate includes a third candidate and a fourth candidate, the third candidate being updated to the first candidate also when all the predetermined number of quantized coefficients included in the coefficient group including the first candidate are substituted by zero, the fourth candidate being not updated to the first candidate when all the predetermined number of quantized coefficients included in the coefficient group including the first candidate are substituted by zero, and the determining a quantized coefficient that is not zero and corresponds to a highest frequency determines the third candidate as the quantized coefficient that is not zero and corresponds to the highest frequency when all the quantized coefficients included in the coefficient groups corresponding to higher frequencies than those of the coefficient group including the third candidate are zero, and determines the fourth candidate as the quantized coefficient that is not zero and corresponds to the highest frequency when the quantized coefficient that is not zero is included in any one of the coefficient groups corresponding to higher frequencies than those of the coefficient group including the third candidate.

4. The video encoding method according to claim 3, wherein, the calculating the coding error calculates the coding error on the assumption that all the quantized coefficients included in the coefficient groups from the coefficient group adjacent to the coefficient group including the second candidate on a higher frequency side to the coefficient group including the first candidate are zero.

5. A non-transitory computer-readable recording medium having recorded thereon a video encoding computer program that causes a computer to execute a process comprising:

dividing a plurality of orthogonal transform coefficients included in each of a plurality of blocks into a plurality of coefficient groups each of which includes a predetermined number of the orthogonal transform coefficients, the plurality of blocks being obtained by dividing a picture included in a video, the plurality of orthogonal transform coefficients being obtained by orthogonally transforming, for each block, a prediction error signal obtained on the basis of difference between a value of each pixel of the picture and a prediction signal of the pixel;

determining, for each of the predetermined number of orthogonal transform coefficients included in a target coefficient group from among the plurality of coefficient groups, a candidate possible to minimize a cost obtained on the basis of a coding error and an amount of coding among a plurality of quantized-coefficient candidates to be used for quantizing the orthogonal transform coefficient, to be a quantized coefficient of the orthogonal transform coefficient, the target coefficient group being selected from among the plurality of coefficient groups sequentially from the coefficient group including the orthogonal transform coefficients corresponding to lowest frequencies;

determining, for a target coefficient group, whether to substitute all the predetermined number of quantized coefficients included in the target coefficient group by zero, on the assumption that a quantized coefficient that is not zero is included in the coefficient group corresponding to higher frequencies than those of the target coefficient group, the target coefficient group being selected from among the plurality of coefficient groups sequentially from the coefficient group including the orthogonal transform coefficients corresponding to the lowest frequencies;

determining, for a target coefficient group, a first candidate for the quantized coefficient corresponding to a highest frequency among the quantized coefficients that are included in the target coefficient group and are not zero, on the assumption that all the quantized coefficients included in the coefficient groups corresponding to higher frequencies than those of the target coefficient group are zero, the target coefficient group being selected from among the plurality of coefficient groups sequentially from the coefficient group including the orthogonal transform coefficients corresponding to the lowest frequencies;

calculating the coding error of the coefficient groups from the coefficient group adjacent to the coefficient group including a second candidate for the quantized coefficient on a higher frequency side to the coefficient group including the first candidate, the second candidate being the quantized coefficient with the highest frequency among the quantized coefficients not being zero, obtained from the coefficient group corresponding to lower frequencies than those of the coefficient group including the first candidate;

updating the second candidate to the first candidate when a comparison cost obtained by subtracting the coding error of the coefficient group corresponding to higher frequencies than those of the coefficient group including the first candidate from the cost obtained for the first candidate is lower than a value obtained by adding the coding error to the comparison cost calculated for the second candidate, and determining the second candidate at time when the second candidate for the coefficient group corresponding to highest frequencies among the plurality of coefficient groups is updated, to be the quantized coefficient that is not zero and corresponds to a highest frequency; and calculating the coding error of the coefficient groups from the coefficient group adjacent to the coefficient group including the second candidate on a higher frequency side to the coefficient group including the first candidate, wherein the second candidate includes a third candidate and a fourth candidate, the third candidate being updated to the first candidate also when all the predetermined number of quantized coefficients included in the coefficient group including the first candidate are substituted by zero, the fourth candidate being not updated to the first candidate when all the predetermined number of quantized coefficients included in the coefficient group including the first candidate are substituted by zero, and the determining a quantized coefficient that is not zero and corresponds to a highest frequency determines the third candidate as the quantized coefficient that is not zero and corresponds to the highest frequency when all the quantized coefficients included in the coefficient groups corresponding to higher frequencies than those of the coefficient group including the third candidate are zero, and determines the fourth candidate as the quantized coefficient that is not zero and corresponds to the highest frequency when the quantized coefficient that is not zero is included in any one of the coefficient groups corresponding to higher frequencies than those of the coefficient group including the third candidate.

* * * * *